United States Patent [19]
Bouton

[11] Patent Number: 5,472,205
[45] Date of Patent: Dec. 5, 1995

[54] OPTO-ELECTRIC GOLF CLUB SWING SENSING SYSTEM AND METHOD

[75] Inventor: Frank M. Bouton, Beaverton, Oreg.

[73] Assignee: Thrustmaster, Inc., Tigard, Oreg.

[21] Appl. No.: 263,615

[22] Filed: Jun. 20, 1994

[51] Int. Cl.$^6$ .................................................. A63B 69/36
[52] U.S. Cl. ................................. 273/187.1; 273/183.1
[58] Field of Search ............................ 273/183.1, 186.1, 273/186.3, 185 R, 185 A, 185 B, 187.1, 195 R, 148 B; 434/252

[56] References Cited

U.S. PATENT DOCUMENTS

| | | |
|---|---|---|
| 3,194,563 | 7/1965 | MacKniesh . |
| 3,778,064 | 12/1973 | Nutter ................... 273/185 B |
| 3,892,414 | 7/1975 | Glasson et al. . |
| 4,137,566 | 1/1979 | Haas et al. . |
| 4,163,941 | 8/1979 | Liss, Jr. . |
| 4,180,726 | 12/1979 | DeCrescent . |
| 4,251,077 | 2/1981 | Pelz et al. ............ 273/186 A |
| 4,254,956 | 3/1981 | Rusnak . |
| 4,542,906 | 9/1985 | Takase et al. . |
| 4,615,526 | 10/1986 | Yasuda et al. ........ 273/185 A |
| 4,767,121 | 8/1988 | Tonner ................ 273/185 A |
| 4,770,527 | 9/1988 | Park . |
| 4,844,469 | 7/1989 | Yasuda et al. . |
| 4,858,934 | 8/1989 | Ladick et al. ........ 273/186.3 |
| 4,958,836 | 9/1990 | Onozuka et al. ..... 273/185 R |
| 4,971,325 | 11/1990 | Lipps . |
| 4,979,745 | 12/1990 | Kobayashi ........... 273/183.1 |
| 4,991,850 | 2/1991 | Wilhlem . |
| 5,056,791 | 10/1991 | Poillon et al. ........ 273/185 R |
| 5,154,427 | 10/1992 | Harlan et al. ........ 273/186.3 |
| 5,245,320 | 9/1993 | Bouton . |
| 5,257,084 | 10/1993 | Marsh .................. 273/186.1 |
| 5,269,519 | 12/1993 | Malone ................ 273/148 B |
| 5,342,054 | 8/1994 | Chang et al. ........ 273/186.1 |

OTHER PUBLICATIONS

Sedra, et al., Adel, "Microelectronic Circuits," pp. 188–191, CBS College Publishing, Holt, Rinehart and Winston, 1982.
"Links 386 Pro," Links Pro Macintosh Fact Sheet, ACCESS Software Incorporated.
Golf Swing Trainer, M–150110, Brookstone catalog, p. 20, Peterborough, N.H.
Flanagan, William J., "Virtual Golf", *Forbes*, Oct. 10, 1994, pp. 140–141.

*Primary Examiner*—Jessica J. Harrison

[57] ABSTRACT

A video golf system responsive to a user swinging a golf club is described. The system includes a video golf game operating on a personal computer having a monitor, a microprocessor, and a serial port. A golf club swing sensing system is coupled to the personal computer through the serial port of the personal computer. The sensing system is mounted on a pad and includes a linear array of photodetectors for detecting a club head offset angle relative to a desired club head axis by sensing reflected light off the underside of the club head. An analog comparator coupled to each photodetector converts the offset to a digital format. A microcontroller samples the digital offset data and processes the data into a form of information required by the personal computer. An input cable coupled between an output of the microcontroller and the serial port transmits the information to the personal computer. The golf game is responsive to the information to determine a corresponding ball path used as an input to the video game.

36 Claims, 14 Drawing Sheets

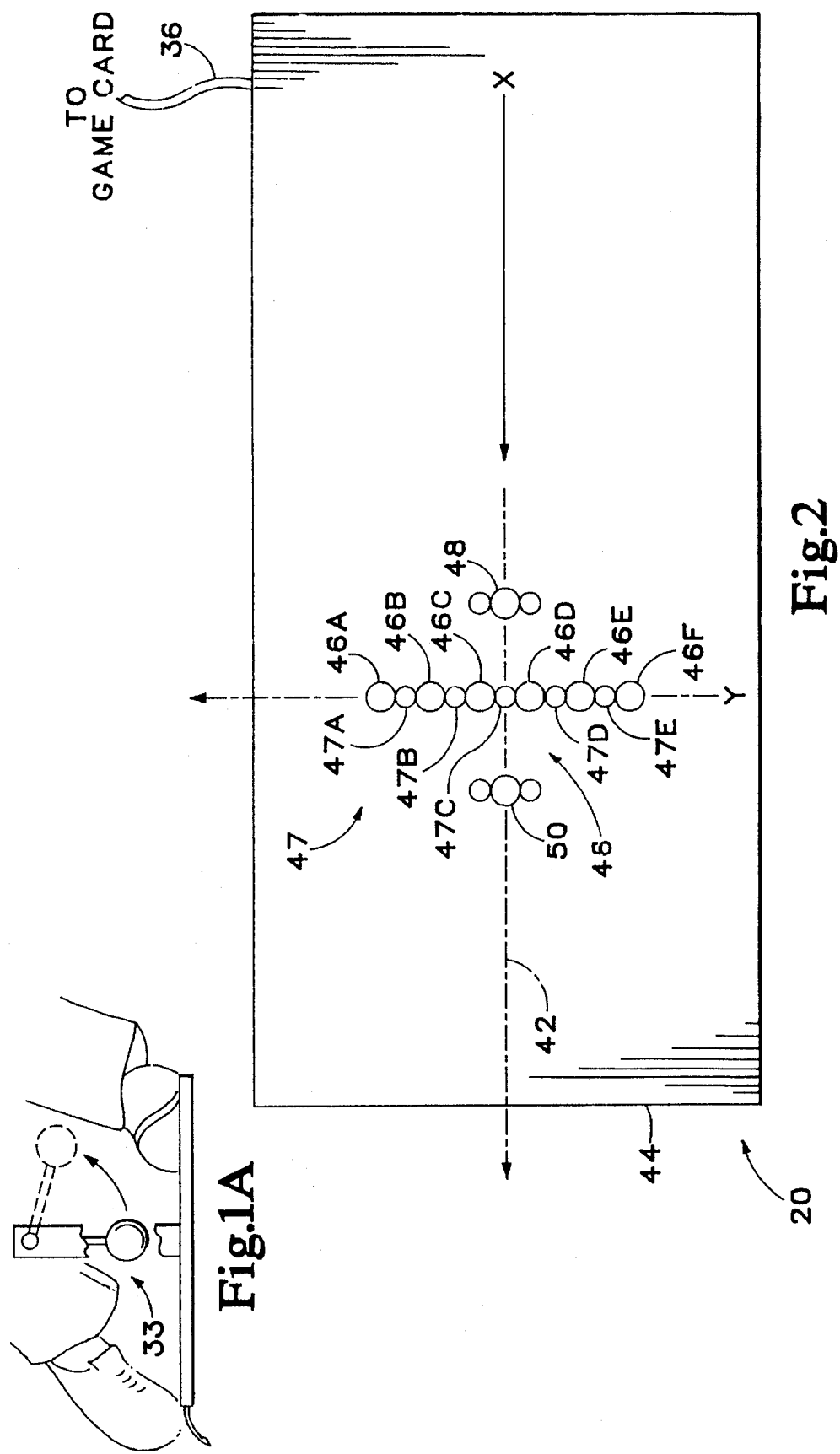

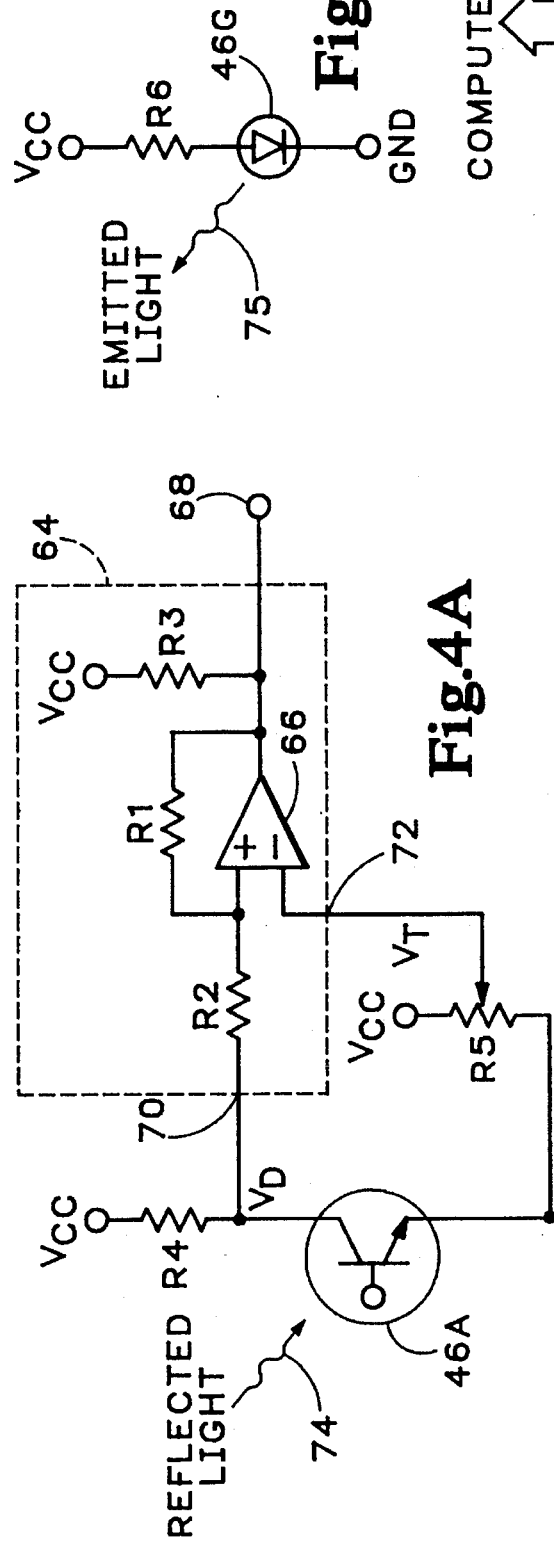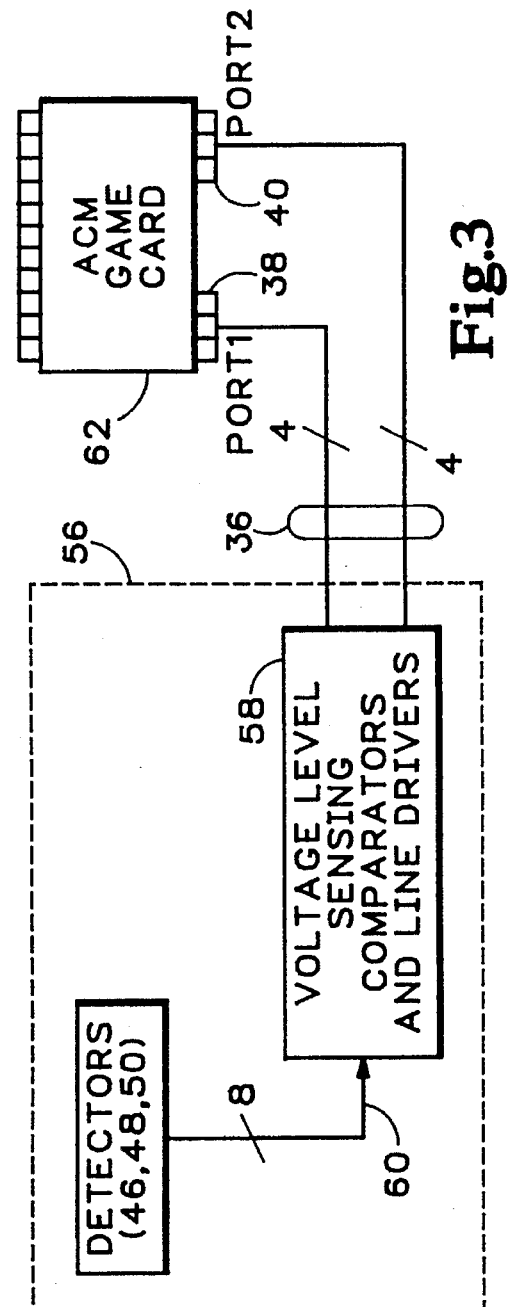

OPTO-ELECTRIC GOLF CLUB SWING SENSING SYSTEM AND METHOD

BACKGROUND OF THE INVENTION

This invention relates generally to video game equipment and more particularly to a golf video game input device.

Advances in video graphics and computing have allowed video games to become more realistic. High performance microprocessors combined with high resolution color displays produce almost life-like video images. Although the image generation capability of video games has increased dramatically, the realism of most video games is limited by the ability of the game to receive realistic input stimuli.

Most video games operable on personal computers rely on a keyboard or joystick to provide input stimuli to the video game. The keyboard has the advantage of providing a plurality of unique alphanumeric inputs. The keyboard, however, is not a realistic input device. In a video golf game, for example, the 'j' and 'k' keys can be used to start and stop a golf swing, respectively. Although the keyboard allows for accurate timing of events, critical information concerning characteristics of the swing is lost, such as the speed and accuracy of the shot. Typically, the golf video games derive such swing characteristic information from the timing of the swing, although this is a coarse approximation.

Preferably, a golf video game would use a golf club as an input stimulus device rather than a keyboard or other input stimulus device such as a joystick. Using a golf club as an input device would allow the video golf game to more realistically calculate a path of the golf ball resulting from the user's actual swing.

There currently exist apparatus for detecting club swing characteristics. However, these golf swing detectors are not used in connection with video golf games because of the complexity and expense of the swing detector. Instead, the swing detectors are employed primarily as a golf instruction aid, where expense is less of a barrier.

An additional problem with using existing golf swing detectors in a video game system is that the number of signals produced by the swing detectors exceeds the input capacity of existing game cards. Game cards are used to couple conventional game input devices, e.g., joystick, to the personal computer. The game cards have a limited number of analog input lines and a limited number of discrete input lines. Industry standard game cards have four analog input lines and four discrete input lines. Thus, if a game card is used, the number of video game input device output signals that can be communicated to the personal computer simultaneously is constrained by the number of inputs on the game card.

A computer-aided golf training device described in U.S. Pat. No. 4,542,906 issued to Takase et al. uses a vertical array of photodetectors to detect the flight of a golf ball, while club head velocity is detected by fiber optic detectors. Although the device can accurately determine the flight path of the ball, the complexity of the device makes it unsuitable as a video game input device. U.S. Pat. No. 4,137,566 issued to Haas et al., uses a plurality of electro-optical sensors to detect the club position at various points along the swing path. However, the Haas apparatus also is too complex and expensive as a video game input device. Moreover, it is unclear how the Takase device or the Haas apparatus could be modified to be compatible with a video game operable on a personal computer.

U.S. Pat. No. 4,991,850 issued to Wilhlem takes a different tack to detect swing characteristics. In Wilhlem, detection sensors and transmission means are built into the golf club. The sensor detects the swing characteristics and the detected characteristics are transmitted to a receiver by the transmission means. Preferably, however, the user would be able to use a standard golf club as an input device rather than the complex golf club required by Wilhlem. Moreover, the signal transmission is not in a format acceptable by the personal computer.

The golf practice apparatus described in U.S. Pat. No. 4,971,325 has been adapted to a personal computer for inputting swing characteristics to a video golf simulator by Sports Sciences, Inc. of Twinsburg, Ohio. However, the system requires a specially designed truncated golf club that projects a light image of a golf club head onto a sensing device.

Accordingly, a need remains for an inexpensive apparatus and method of using a golf club as an input device to a video golf game.

SUMMARY OF THE INVENTION

It is, therefore, an object of the invention to use a golf club in cooperation with a golf video game to produce a realistic video golf system.

Another object of the invention is to detect at least three basic shots: a hook, a slice, and a straight shot.

A further object is to provide a simpler, less expensive golf swing detector.

The invention is a video golf system responsive to a user swinging a golf club. The system includes a video golf game operating on a personal computer having a monitor, a microprocessor, and an input/output bus for receiving game cards. A first embodiment of a golf club swing sensing system is coupled to the personal computer through a game card connected to the input/output bus of the personal computer. The sensing system is mounted on a pad and includes means for detecting a club head offset and transmitting corresponding signals to the personal computer. In a preferred embodiment, the sensing system comprises a linear array of photodetectors for detecting a club head offset angle relative to a desired club head axis, an analog comparator coupled to each photodetector for converting the offset to a digital format, and an input cable coupled between the output of the comparators and the game card for transmitting the digital offset to the personal computer.

The golf game includes means for processing the club head offset signals into swing types for use in the game to determine golf ball flight paths. In one embodiment, the golf game converts the digital offset information to golf swing characteristic information by accumulating the offset information. The golf game is responsive to the accumulated digital offset to determine a corresponding ball flight path used as an input to the video game. The offset processing means within the golf game compares digital sample values of adjacent photodetectors to determine the offset angle. The results from comparisons of successive samples are accumulated. The accumulated values are then compared to determine which of three swings is detected. The three swing types identified using the swing sensing method are: hook, slice, and straight.

A hook offset is determined where the first sample value is greater than the second sample value. A slice offset is determined where the first sample value is less than the second sample value. A straight offset is determined where the first sample value is equal to the second sample value.

In a second embodiment, the swing sensing system is coupled to the personal computer through a serial input port. The system further includes a microcontroller which samples the outputs of the photodetectors and processes the samples to produce the swing characteristics desired by the video game. The system includes a first linear array of photodetectors for detecting the club head position at impact, a second linear array of photodetectors for detecting the club head direction following impact, and a pair of photodetectors for sensing the speed of the club head at impact. The speed of the club head can also be used to vary the sampling rate of the photodetectors to minimize the amount of memory used in the system.

The system can further include means for detecting the height of the club head at impact. This information is then used to determine whether the resulting shot was either "fat", "thin", or "sweet." The height is preferably detected by sensing the amount of light reflected off the underside of the club head. A plurality of light-emitting diodes (LEDs) are interposed between the photodetector elements in the photodetector arrays to illuminate the underside of the club head. The light emitted by the LEDs is reflected off the underside of the club head and detected by the photodetectors. The intensity of the detected light indicates the height of the club. Also, this aspect of the invention can include means for calibrating the club height, which allows the user to specify a preferred height at address. The detected height is then judged according to this preferred height.

In a third embodiment of the invention, a vertical column of LEDs and a vertical column of photodetectors are mounted on opposite, respective sides of the pad for detecting club head height and club face pitch at impact. The invention samples the vertical column of photodetectors to form a matrix of vertical club head samples. The invention determines the height of the club head at impact by sensing which of the photodetectors sensed the club head at impact. The invention determines the vertical club head pitch or angle by summing the vertical samples for each photodetector to form a one-dimensional array of sums. The array of sums is then put through a linear least squares fit algorithm to determine a slope. The pitch of the club face at impact is then determined from the slope by taking the arc-tangent of the slope. This same basic procedure can be used on the horizontal club head samples to determine the horizontal club face angle at impact.

An advantage of the invention is the ability to use a personal computer with a game board interface for inputting swing characteristic information to the video golf system.

Another advantage of the invention is the ability to allow the user to specify a preferred height of the club head at impact.

A further advantage of the invention is the increased bandwidth of the LEDs.

A yet further advantage of the invention is the minimization of memory necessary to store the club head position samples.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1A is an illustration of a golf ball mounting apparatus that can be used in conjunction with the invention.

FIG. 2 is a top plan view of a first embodiment of a golf head sensor for use in connection with the video game system of FIG. 1.

FIG. 3 is a block diagram of the golf head sensor electronics for the embodiment of FIG. 2 and a compatible dual ported game card connectable to the personal computer.

FIG. 4A is a schematic of a photodetector of FIG. 2 and an associated comparator for converting a detector signal to a digital format.

FIG. 4B is a schematic of a light emitting diode (LED) circuit for use in the invention.

DETAILED DESCRIPTION

Figure 1:
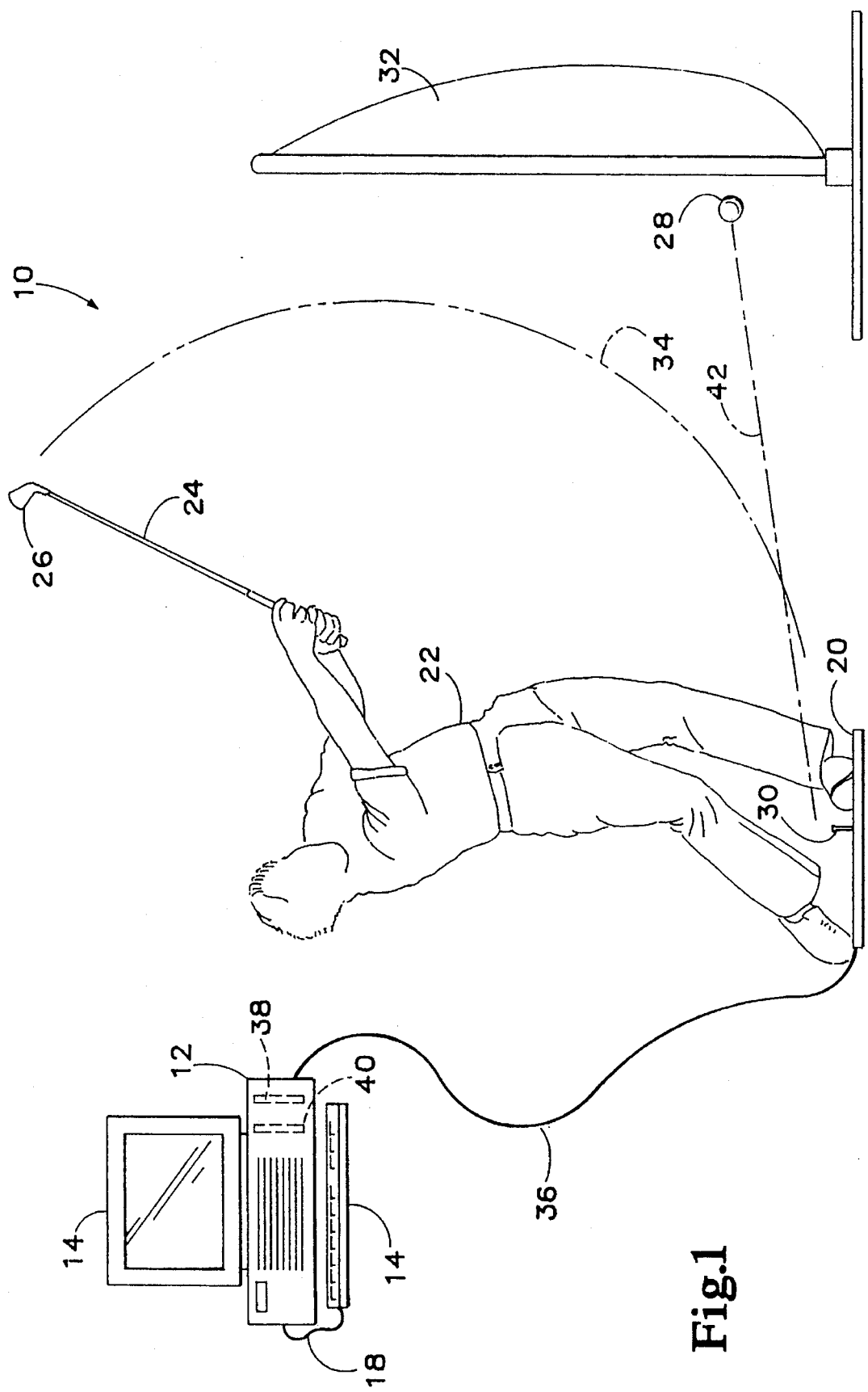
FIG. 1 is an illustration of a video golf game system using a personal computer according to the invention.

Referring to FIG. 1, an opto-electric golf club swing sensing system is shown generally at 10. The system includes a conventional personal computer 12 having a monitor 14 and a keyboard 16 which is coupled to the personal computer 12 through cable 18. A personal computer 12, in the preferred embodiment, includes a video golf game program operable on a microprocessor (not shown) included in the personal computer 12. One popular video golf game program is "Links 386," manufactured by Access Software of Salt Lake City, Utah. The golf game simulates a round of golf and is responsive to user input. In prior art video golf simulators, the input is provided by the keyboard 16. According to the invention, however, the video game input is supplied by an opto-electric golf club swing sensor 20.

The swing sensor 20 is positioned relative to a user 22 such that a golf club head 26 passes over the sensor 20 when swung by the user. In the preferred embodiment, the swing sensor 20 is positioned in front of the user at a point where the club face 26 would normally impact a golf ball 28 positioned on a golf tee 30. The golf club sensor 20 is able to detect the position of the club face 26 at the point where the club face contacts the ball, as described below.

Although in FIG. 1 a golf ball and tee are used, the ball and tee are not necessary according to the invention. If the ball is used, however, a net 32 is preferably located opposite the ball 28 to receive the ball when struck by the club face 26. Shown in FIG. 1A is the preferred embodiment of a ball mounting apparatus 33. The ball mounting apparatus suspends the ball over the club swing sensor. The apparatus allows the user to change the height of the ball from the sensor 20. When struck by the club head, the ball rotates about a pivot axis. This eliminates the need for the net. Such a ball mounting apparatus is sold by Brookstone of Peterborough, N.H. under the product number M-150110.

Figure 6A:
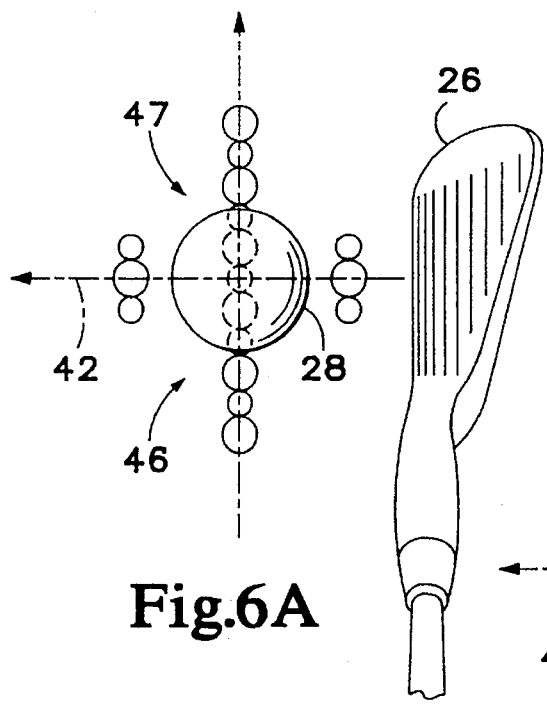
FIGS. 6A and 6B are an illustration of a preferred stroke wherein a club face contacts the ball with no offset from the club head axis.
Figure 6B:
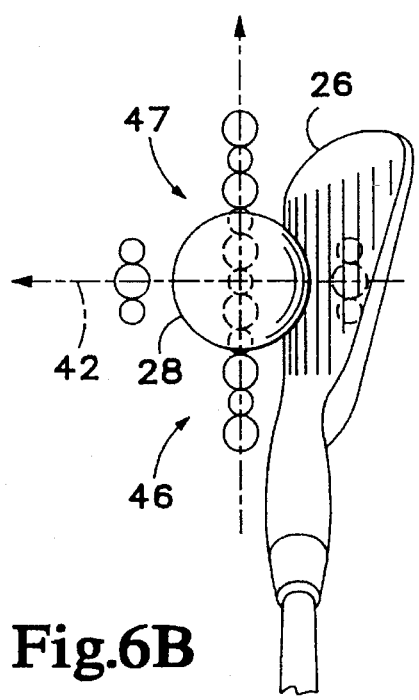

The opto-electric swing sensor 20 senses the club face position relative to a desired club face position or axis at the impact point. In an ideal golf swing, the user swings club 24 so as to strike the ball at the impact point with the club face perpendicular to a desired ball path 42 as shown in FIGS. 6A and 6B. The opto-electric sensor 20 senses the position of the club face as the club face approaches the impact point, at the impact point, and after the impact point. The position of the club face is then converted to a digital position signal which is transmitted to the personal computer 12 via cable 36. In addition, the sensor 20 detects the club face speed and transmits a digital velocity signal to the personal computer, as described further below.

The sensor 20 is coupled to the personal computer 12 through a cable 36 (FIG. 1). In a first embodiment of the invention, the cable 36 is coupled to the personal computer 12 through a dual-port game card 62 (FIG. 3) as described in commonly assigned U.S. Pat. No. 5,245,320 entitled MULTI-PORT GAME CARD WITH CONFIGURABLE ADDRESS. The game card is inserted into a backplane of the personal computer in a convention manner, as is known in the art. The cable 36 includes two connectors (38, 40) which are coupled to compatible connectors on the dual-ported game card. The position and velocity signals detected by the sensor are converted to a digital format by the sensor 20 and transmitted as digital data to the personal computer via the cable 36. The dual-ported game card is used to increase to eight the number of available digital lines between the sensor 20 and the personal computer 12.

There are several alternative means for transmitting the digital position and velocity information to the personal computer other than through a dual-ported game card. Alternatively, the digital information could be serialized by using a parallel-to-serial convertor and the serial data transmitted to the personal computer through a serial input port on the personal computer. This is the approach taken in a second embodiment of the invention described hereinafter with reference to FIGS. 8–12.

The video game operable on the personal computer is responsive to the digital club face position signals such that the video game projects a simulated ball path on the monitor 14. In order for the video game to accurately project the ball path, the video game maintains information concerning the lie of the ball as well as the particular club selected by the user. The lie of the ball is determined by the accuracy of the user's previous shot, as it would be in a normal golf game. The particular club selection can be changed by the user via the keyboard.

Referring now to FIG. 2, a first embodiment of the opto-electric swing sensor is shown generally at 20. The swing sensor includes a pad 44 which, in the preferred embodiment, is made of a resilient plastic material able to withstand a club impact. Mounted on the pad 44 is a linear array of photodetectors 46 including, in the preferred embodiment, six individual photodetectors 46A–46F. The individual photodetectors are aligned along an axis Y, referred to hereinafter as the club head axis. The club head axis Y is perpendicular to the desired ball path 42 represented by axis X. The individual photodetectors 46A–46F are spaced apart along the club head axis Y to span the entire club face. The array 46 is used to detect the position of the club face relative to the club head axis Y.

A start photodetector 48 and a stop photodetector 50 are positioned on opposite sides of the photodetector array 46. The start and stop photodetectors are positioned colinear to the desired ball path 42. In the preferred embodiment, the start detector and the stop detector are symmetrical about the photodetector array 46. The start and stop photodetectors are used to detect the club face speed at the impact point. The start detector 48 starts a timer when the club face is detected. The timer runs until the club face is detected by the stop photodetector 50. The known displacement between the start photodetector and the stop photodetector and the timer value are used to calculate the club head velocity as it crosses the photodetector array, as described herein below.

The light detected by the photodetector array 46 is provided by a plurality of light emitting diodes (LED) 47A–47E interposed between the individual photodetectors of the array 46. The LEDs, such as, for example, LED 47A, illuminate the underside of the club head as the club head passes over the array 46. The individual photodetectors detect the light emitted by the LEDs that is reflected off the underside of the club head.

Referring now to FIG. 3, the opto-electric swing sensor is shown in block diagram 56. The block diagram 56 includes photodetectors 46, 48, and 50, and voltage level sensing comparators and line drivers 58. The photodetectors are coupled to the voltage sensing comparators and line drivers via bus 60. In the preferred embodiment, the voltage level sensing comparators and line drivers 58 are mounted on a printed circuit board which is secured inside the pad 44. The photodetector output photodetection signals on bus 60 are proportional to the amount of light detected by the respective photodetector. The voltage level sensing comparators compare the light detection signals to a pre-determined threshold to determine whether the club head is detected. If the club head is detected, the line drivers drive a digital signal on a corresponding conductor to a dual port game card 62.

The outputs of the eight photodetectors, i.e., 46A–46F, 48, and 50, are each coupled to corresponding conductors in bus 60. The cable 36 used to couple the swing sensor 56 to the game card 62 includes a conductor corresponding to each of the photodetector outputs. The conductors in cable 36 are connected to a corresponding discrete, digital input of the game card 62. A dual-ported game card 62 is required to support the eight photodetectors in the preferred embodiment because each port includes only four digital input lines.

Referring now to FIG. 4A, an exemplary voltage comparator and line driver 64 is shown coupled to a photodetector 46A. The comparator and line driver 64 is exemplary in that an additional comparator and line driver is required for each of the other photodetectors (46B–46F, 48 and 50) in the swing sensor.

The comparator and line driver 64 includes an op-amp 66 which, in the preferred embodiment, is part number LM339 manufactured by various manufacturers. A feedback resistor R1 is coupled between the output and the non-inverting input of the op-amp. A pull-up resistor R3 is coupled between the output of the op-amp and the supply voltage $V_{cc}$. The output of the op-amp is further coupled to terminal 68 which is then connected to a conductor in cable 36 corresponding to the photodetector 46A. An input resistor R2 is coupled between an input 70 of the comparator line driver 64 and the non-inverting input of the op-amp 66.

A variable resistor R5 is coupled between the supply voltage Vcc and the ground voltage GND. The variable output is coupled to the inverting input of the op-amp 66 to provide a threshold voltage $V_T$. The variable resistor R5 can be adjusted to produce a threshold voltage $V_T$ anywhere in the range between the supply voltage $V_{cc}$ and the ground voltage GND.

The op-amp configuration shown results in a conventional comparator, as is known in the art. The op-amp 66 compares a voltage $V_D$ received on input 70 to the voltage $V_T$ received on input 72. The difference between the voltage level of signal $V_D$ and the voltage level of signal $V_T$ is multiplied by the gain of the op-amp circuit, i.e., R1/R2, and output on terminal 68. The output signal on terminal 68 is driven between $V_{DD}$ and GND depending on the polarity of the difference. In this way, the op-amp 66 operates as both a comparator and a digital line driver.

The voltage signal $V_D$ represents the amount of light detected by photodetector 46A. The photodetector 46A has a bias resistor R4 coupled between the collector of the photodetector and the supply voltage VCC. The emitter of the photodetector is coupled to the ground voltage GND. The base of the photodetector receives light generated by the LEDs that is reflected off the underside of the club head. This reflected light is represented by arrow 74. When the photodetecter detects a sufficient level of light, the photodetector conducts current and the voltage level of signal $V_D$ drops to the voltage across the collector and emitter of the photodetector. If a sufficient amount of light is not detected, such as when the club face blocks the light produced by the light source, the photodetector 46A does not conduct a current and the voltage level of signal $V_D$ is approximately equal to the supply voltage $V_{cc}$.

Figure 5A:
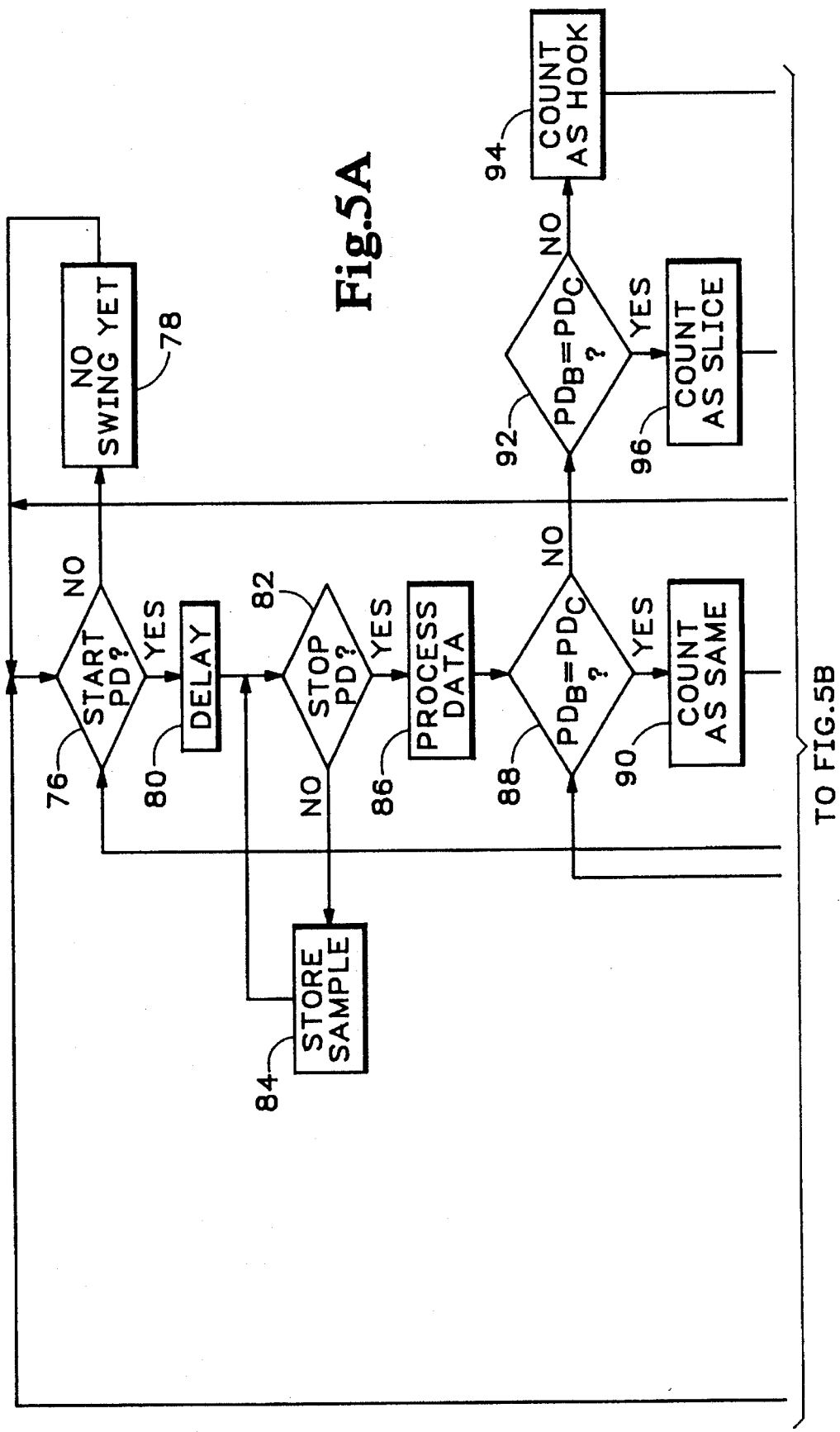
FIGS. 5A, 5B, and 5C are flow charts of a method according to the invention of converting the digital signals produced by the golf head sensor into stroke characteristics for use in the golf video game to determine a corresponding simulated golf ball path.
Figure 5B:
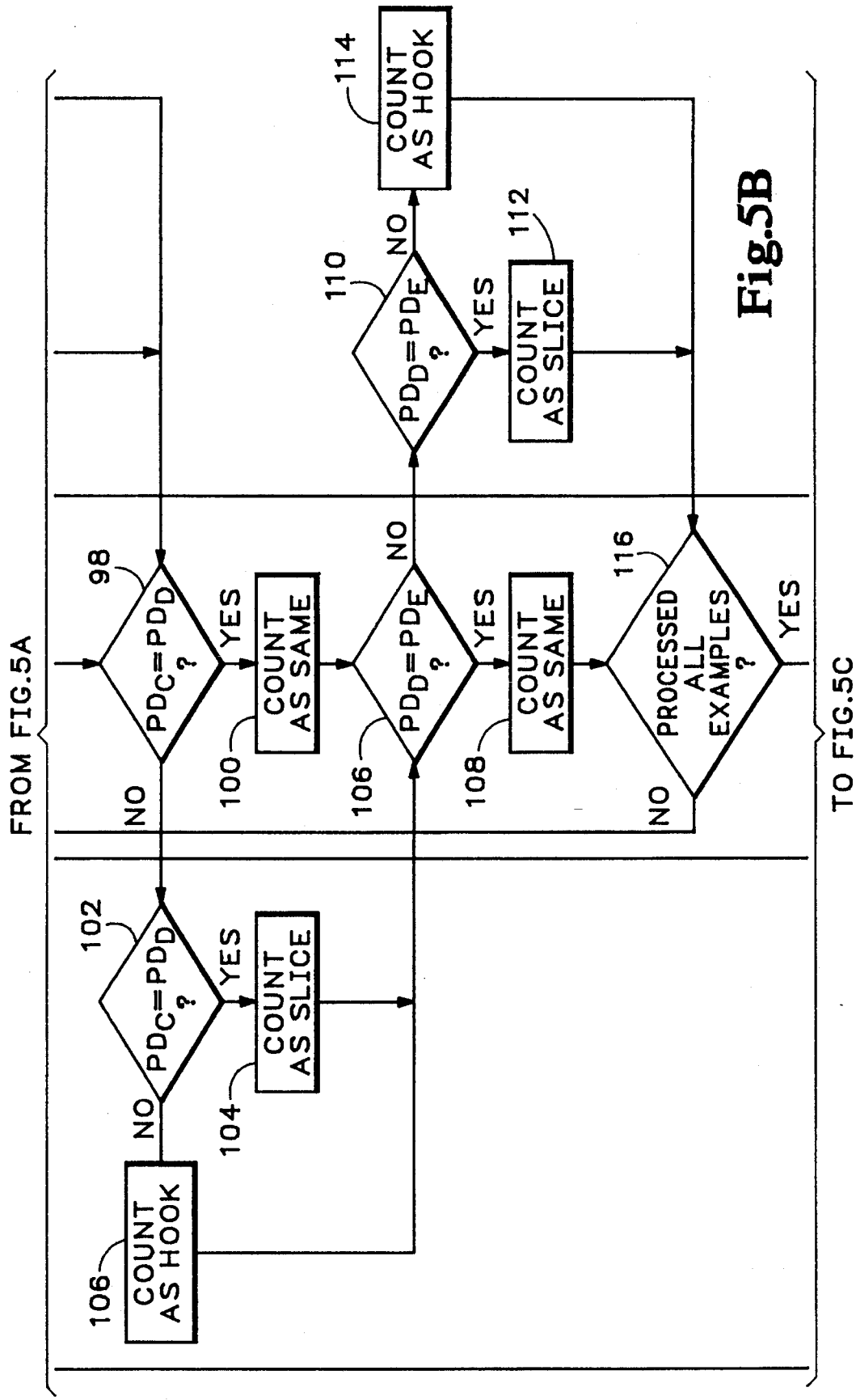
Figure 5C:
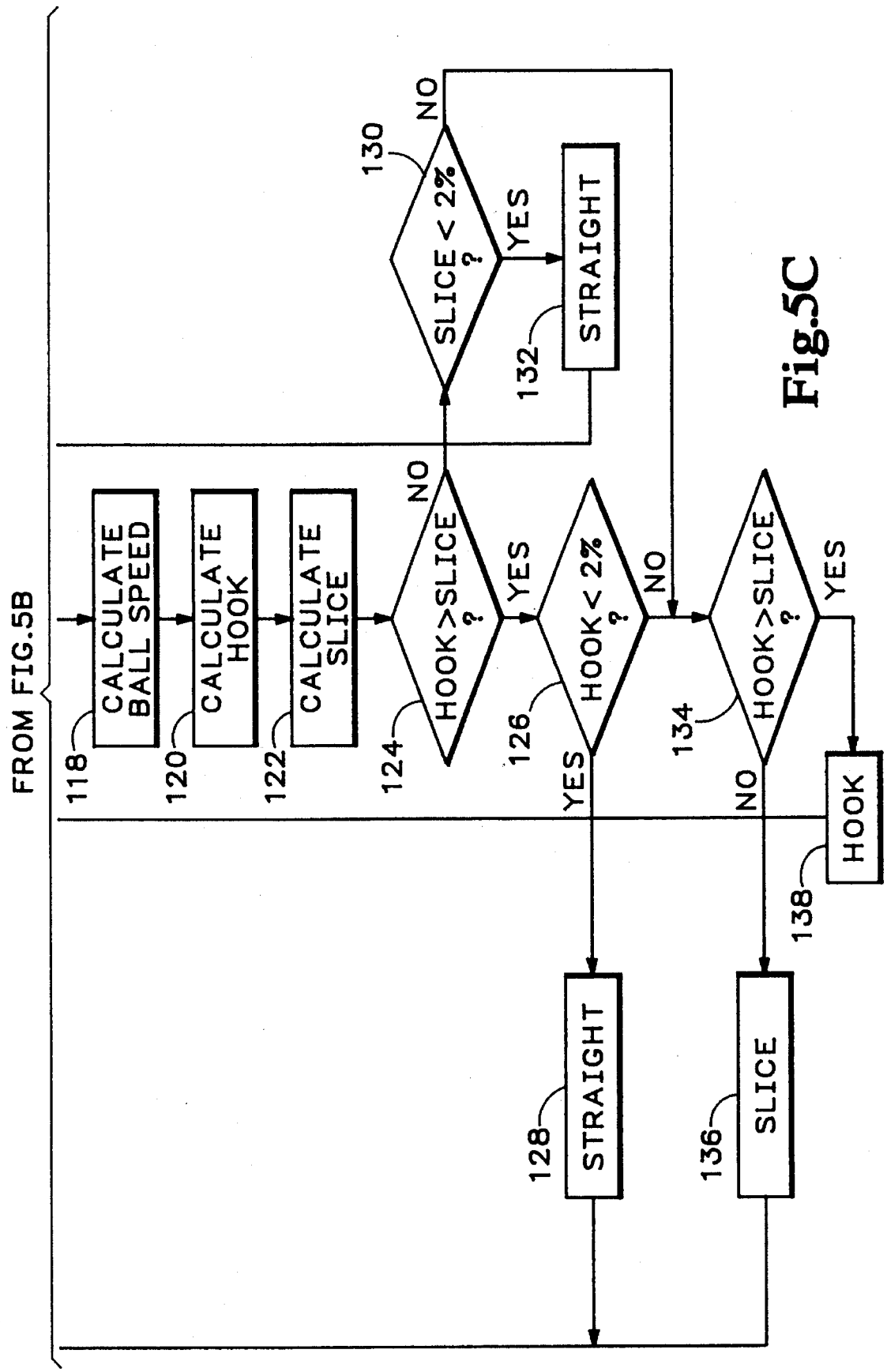

Referring now to FIGS. 5A–5C, a method of processing the club face position and velocity signals produced by the comparator and line driver circuit 58 is shown. In the description that follows, an active signal on a particular photodetector corresponds to a sufficient amount of light being received at that particular photodetector. This occurs, under normal circumstances, when the club face is detected at the particular photodetector. In the preferred embodiment, the method is integrated into the video simulation program operating on the personal computer. However, in an alternative embodiment, the method or process can operate independent of the video game program, e.g., a terminate and stay resident (TSR) routine, and translate the position and velocity signals from the golf swing sensor to a format required by the video game program.

The method begins in step 76 (FIG. 5A). The step continuously samples the start photodetector. If an active signal is not detected, the method transitions to step 78 and step 76 is repeated. If an active signal is detected on the start photodetector, the method waits a predetermined amount of time in step 80 to allow the club face to reach the array of photodetectors. In the preferred embodiment, the predetermined amount of time equals 50 uSec.

In steps 82 and 84, the method samples the array of photodetectors and stores the resulting digital position information until an active signal is detected on the stop photodetector. Once an active signal is detected on the stop photodetector, the method transitions to step 86 to begin processing the position and velocity information.

The position information can be considered an array having N number of six-bit entries, each entry corresponding to each sample taken of the photodetector array. Each bit in an entry corresponds to the light detected at a corresponding photodetector. The sampling rate, that is, the time period between successive samples, can be set to a predetermined amount using a timing loop or, alternatively, can be simply the maximum sampling rate of the computer.

The subsequent steps of processing the position and velocity information can best be understood with reference to FIGS. 6A and 6B. FIG. 6A shows the club face 26 moving towards the ball 28 just prior to impact. The club face is moving generally along the desired swing path 42. Referring now to FIG. 6B, the club face is shown about to pass through the impact point with the club face 26 parallel to the array of photodetectors, i.e., parallel to the Y axis. Thus, for a perfectly aligned impact, the club face 26 should be detected simultaneously by each of the photodetectors in the array 46.

Figure 7A:
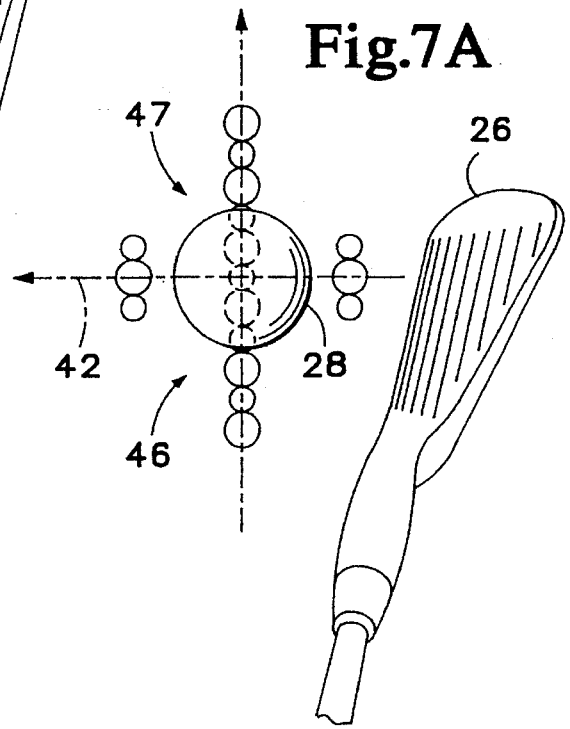
FIGS. 7A and 7B are an illustration of a slice stroke wherein the club face contacts the ball with a slice offset from the club head axis.
Figure 7B:
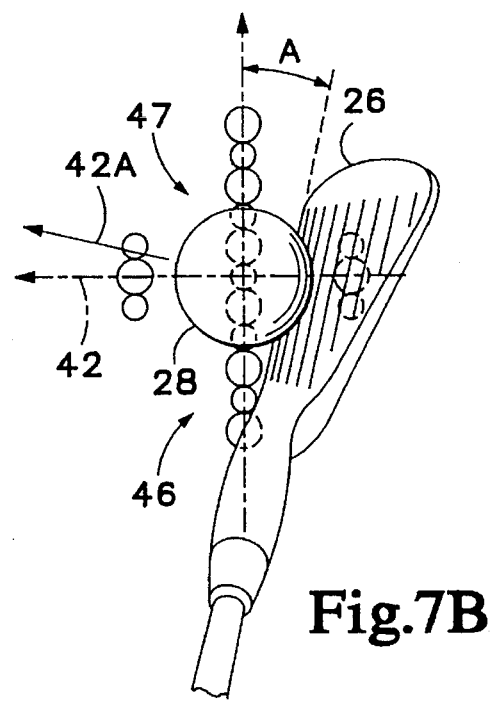

In contrast, as shown in FIGS. 7A and 7B, if the club face 26 approaches the impact point at an offset angle A relative to the array of photodetectors 46, the club face is detected by different photodetectors at different times. This results in the ball being projected along a path 42A other than the desired ball path 42. The method accumulates the offset angle detected at each sample to determine whether the ball is projected along a straight, i.e., desired, ball path or a slice or hook ball path. The offset angle A shown in FIGS. 7A and 7B produces a slice. Slice and hook ball paths are relative terms, however, which are actually determined by the handedness of the player.

Returning to FIG. 5A, the method begins processing the position information in step 88 by comparing the bits representing the photodetectors 46B and 46C, i.e., $PD_B$ and $PD_C$, respectively. If the values are the same, the method increments a counter representing the number of bits that are the same in step 90. If, however, $PD_B$ is not equal to $PD_C$, $PD_B$ is compared to $PD_C$ in step 92 to see which of the two detected the club face. If $PD_B$ is greater than $PD_C$, i.e., $PD_B=1$ and $PD_C=0$, a hook counter is incremented in step 94 to indicate that the club face is in a hook position. If $PD_B$ is less than $PD_C$, a slice counter is incremented in step 96 to indicate that the club face is in a slice position relative to the desired club face position.

A similar sequence is repeated for the bits representing photodetectors 46C and 46D, i.e., $PD_C$ and $PD_D$, respectively, as shown in FIG. 5B. In step 98 $PD_C$ is checked to see whether it is equal to $PD_D$. If the two are equal, the same counter is incremented in step 100. If the two are not equal, $PD_C$ is compared to $PD_D$ in step 102. If $PD_C$ is greater than $PD_D$ the slice counter is incremented in step 104. If, however, $PD_C$ is less than $PD_D$, the hook counter is incremented in step 106.

Next, in step 106, the bit representing photodetector 46D is compared to a bit representing photodetector 46E, i.e., $PD_E$. If the two are the same, the same counter is incremented in step 108. If the two are not the same, $PD_D$ is compared to $PD_E$ in step 110. If $PD_D$ is greater than $PD_E$, the slice counter is incremented in step 112. If not, the hook counter is incremented in step 114.

Following either step 112 or 114, step 116 determines whether all of the position information has been processed. If there are samples remaining to be processed, step 116 transitions back to step 88 (FIG. 5A) and steps 88–114 are repeated. This sequence is repeated for all of the position samples.

Once all of the position samples are processed, the club head velocity is determined in step 118 (FIG. 5B). The club head velocity is determined by the distance between the start detector 48 and the stop detector 58 and the time between the detection of the club head by the start detector and the detection of the club head by the stop detector. The time period is equal to the sample period times the number of samples between the start and stop detections.

In step 120, the amount of hook is calculated. The hook amount is determined by the ratio of the hook count to the same count. Similarly, in step 122, the amount of slice is determined. The amount of slice is determined by taking the ratio of the slice count to the same count.

In step 124, the amount of hook is compared to the amount of slice. If the amount of hook is greater than the amount of slice, the hook amount is compared to a predetermined amount of hook in step 126 (e.g., 2%). If the hook amount is less than the predetermined amount, input data is supplied to the video game in step 128, wherein the computer is responsive thereto to produce a straight shot. If, however, the hook amount is less than the slice amount, the slice amount is compared to the predetermined amount in step 130 (2%). If the slice amount is less than the predetermined amount, step 132 provides the straight input to the video game, the video game being responsive to project a straight shot on the monitor.

If either the hook or the slice amount are greater than the predetermined amount and the hook amount is greater than the slice amount, a hook input is provided to the video game in step 138. The video game is responsive to the hook input to project a ball path in the video game which corresponds to a hook shot. If the slice is greater than the hook, a slice input is input to the video game in step 136. The video game is responsive to the slice input to project a ball path that corresponds to a slice shot.

Figure 8:
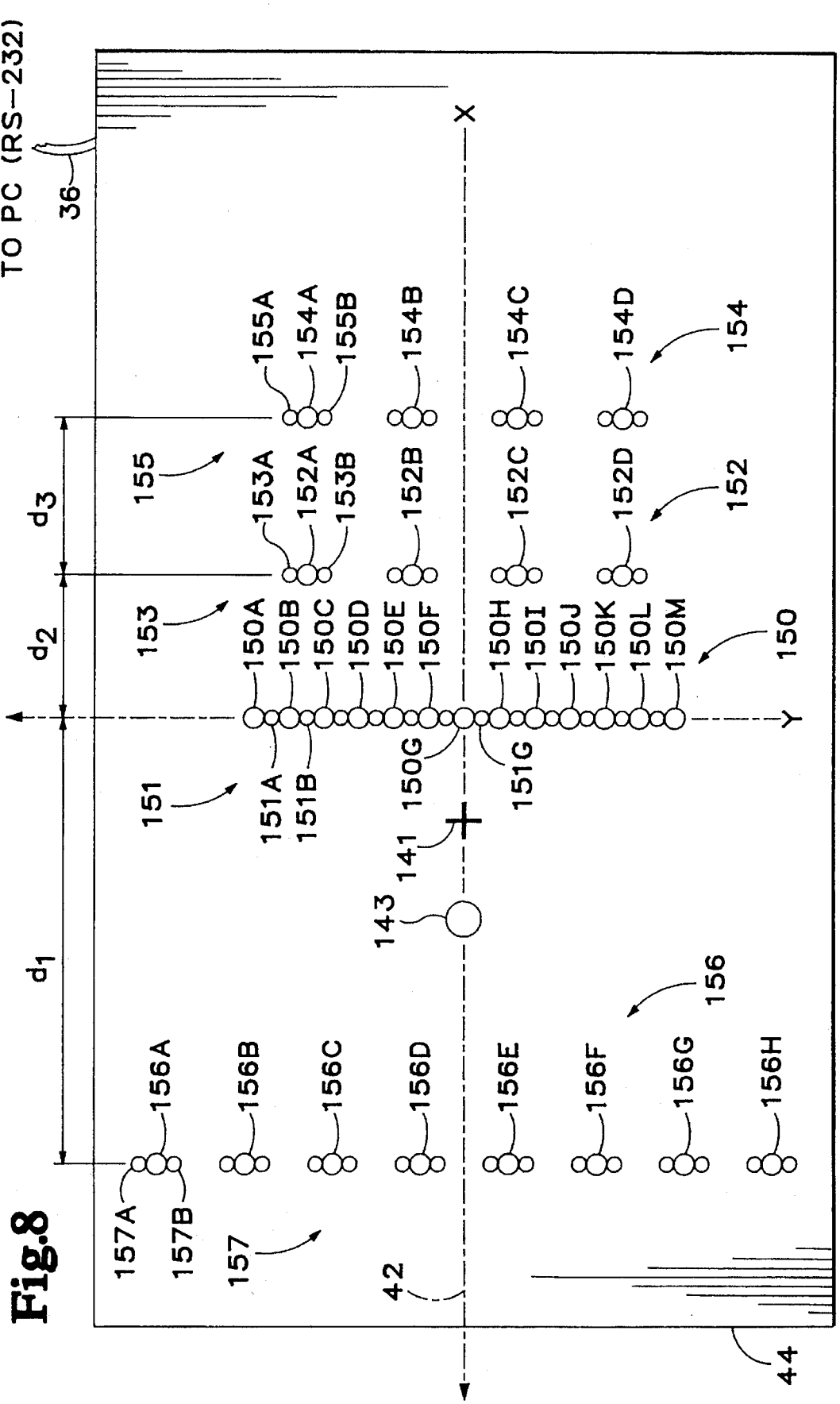
FIG. 8 is a top plan view of a second embodiment of a golf head sensor according to the invention for use in connection with the video game system of FIG. 1.

Referring now to FIG. 8, a second embodiment of the invention is shown. The embodiment shown in FIG. 8 includes the same pad 44 but a different photodetector arrangement as well as a different means for transmitting digital offset information to the personal computer. The sensor shown in FIG. 8 includes a first linear array of photodetectors 150 having a plurality of individual phototransistors 150A–150M disposed along the club head axis Y. Interposed between adjacent photo detectors is an array of LEDs 151 including, e.g., LEDs 151A–151B. This first array of photodetectors 150 is used in the same manner as the array 46 of FIG. 2, i.e., to detect the club head position at impact.

The sensor further includes a second linear array 156 of photodetectors having a plurality of photodetectors 156A–156H disposed along an axis parallel to the first array 150. The array 156 is spaced apart from array 150 by a distance $d_1$, which in the preferred embodiment is several inches. Associated with each photodetector 156A–156F is a corresponding pair of LED such as, e.g., 157A–157B. The array 156 is used to detect the club head direction following impact, i.e., follow-through. The photodetectors 156A–156F are spaced further apart than the photodetectors of array 150 since the same lateral precision is not needed to detect the follow through as is needed to detect the club face position. Furthermore, the outer photodetectors 156A and 156F are spaced farther apart than the first and last photodetectors 150A and 150M of array 150.

The sensor includes a start array of photodetectors 152 and a stop array of photodetectors 154 for detecting the club head speed. Arrays 152 and 154 are both spaced apart from and parallel to array 150. Associated with the arrays 152 and 154 are respective arrays of LEDs 153 and 155. The LEDs are pair up with associated photodetectors in the same manner as for array 156. For example, photodetector 152 A has associated therewith a pair of LEDs 153A–153B. Array 152 is spaced apart from the array 150 by a distance $d_2$. Similarly, array 154 is spaced apart from photodetector 152 by a distance $d_3$.

The LEDs are paired, e.g., 153A and 153B, so as to increase the light intensity of the combination. This is accomplished by driving one of the LEDs in the pair with a clock signal and the other LED of the pair with the complement of the clock signal, i.e., a complementary clock signal. The clock signal and the complementary clock signal each have a frequency approximately equal to the maximum operating frequency of the LED, i.e., its bandwidth. In this way the photodetector receives light at twice the intensity of a single LED. This enables the swing detector to increase its sampling rate and thereby increase the resolution of the swing detector.

FIG. 8 also shows a cable 36 connected to pad 44 for transmitting digital information from the sensor to the personal computer 12. In the first embodiment, cable 36 is connected to a dual port game card. In the second embodiment shown in FIG. 8, however, cable 36 is connected to a serial interface of the personal computer 12, e.g., RS-232. Alternatively, cable 36 could be connected to a bidirectional parallel port or an ethernet interface, for example.

Figure 9:
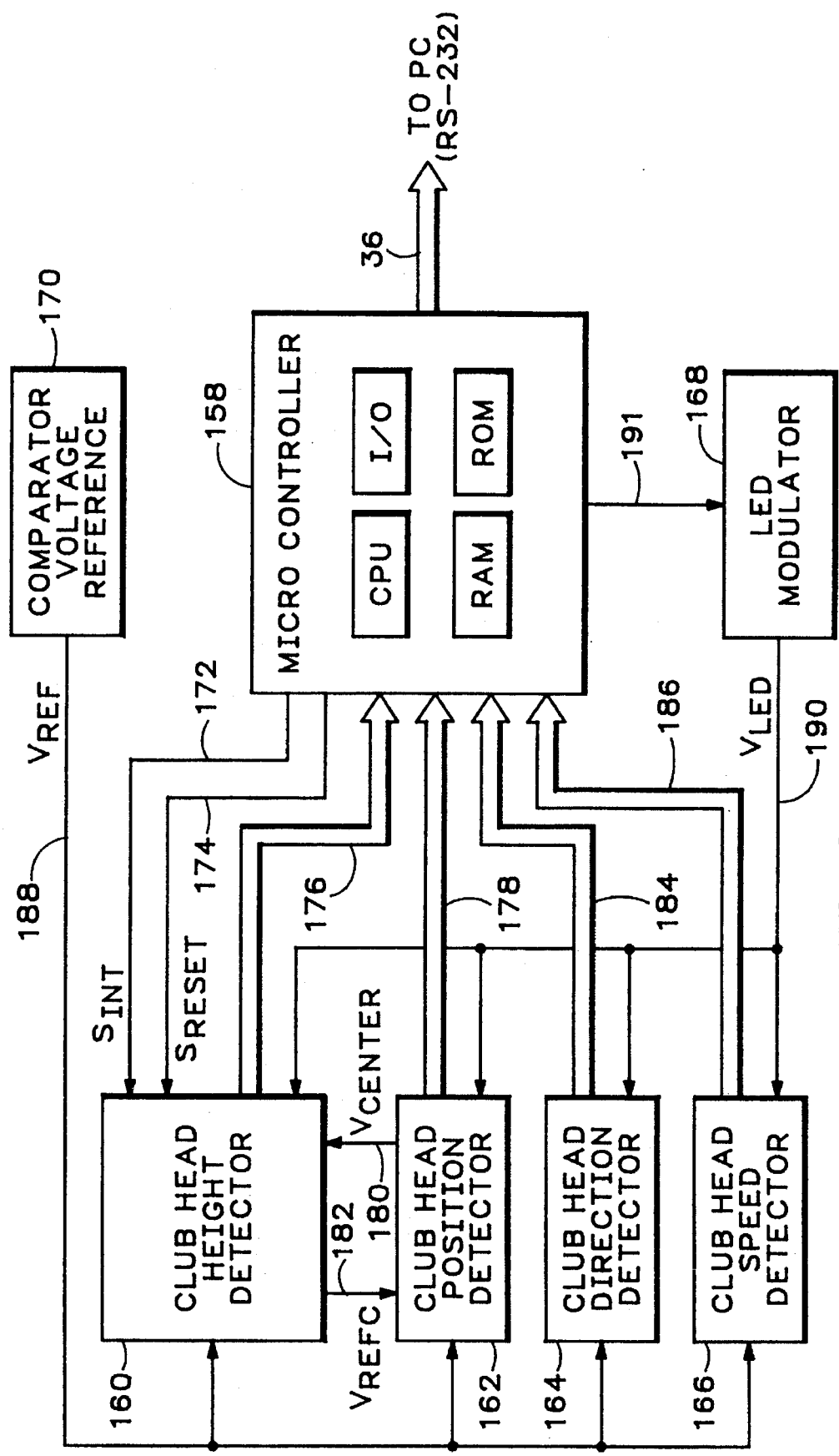
FIG. 9 is a block diagram of the electronics of the second embodiment of the invention shown in FIG. 8.

Referring now to FIG. 9, a block diagram of the electronics for the second embodiment of the invention is shown. The electronics include a microcontroller 158 which, in the preferred embodiment, is part number 16C64 manufactured by Microchip of Chandler, Ariz. The microcontroller includes a plurality of I/O pins for sending and receiving digital I/O data. The microcontroller 158 also includes internal memory in the form of a read-only memory (ROM) and a random-access memory (RAM). No external memory is required in the invention because of the club head sampling rate optimizations performed by the microcontroller, as described further below. The microcontroller also includes an internal timer circuit (not shown).

The electronics further include a club head height detector circuit 160, a club head position detector circuit 162, a club head direction detector circuit 164, and a club head speed detector circuit 166. The club head height detector 160 determines the height of the club head relative to the pad 44 and determines therefrom whether the swing is "fat," "thin," or "sweet." The club head position detector 162 includes the first array of photodetectors 150 and the corresponding LEDs and determines the offset of the club face relative to the club head axis. The club head direction detector 164 includes the second array of photodetectors 156 and the accompanying LEDs and determines the follow-through of the club head. The club head speed detector 166 includes arrays of photodetectors 152 and 154, as well as the accompanying LEDs, and is used to determine the club head velocity.

The electronics further include an LED modulator circuit 168 which is coupled to the microcontroller via line 191 and which further includes an output coupled to circuits 160–166 via line 190 for providing a pulsed voltage signal $V_{LED}$. The voltage signal $V_{LED}$ is provided to all of the LEDs in the corresponding circuits, with the exception of the center LED 151G, to actuate the LEDs responsive thereto. The voltage signal $V_{LED}$ is pulsed responsive to a control signal issued by the microcontroller on line 191. The LEDs are pulsed by the microcontroller 158 to produce the maximum light intensity. The center LED 151G is provided a separate voltage signal $V_{REFC}$ to allow the user to specify the preferred height of the club head, as described further below with reference to FIG. 11B.

A comparator voltage reference 170 provides a reference voltage $V_{REF}$ to the circuits 160–166, which acts as a threshold voltage for all of the comparators, as described further below.

Figure 10:
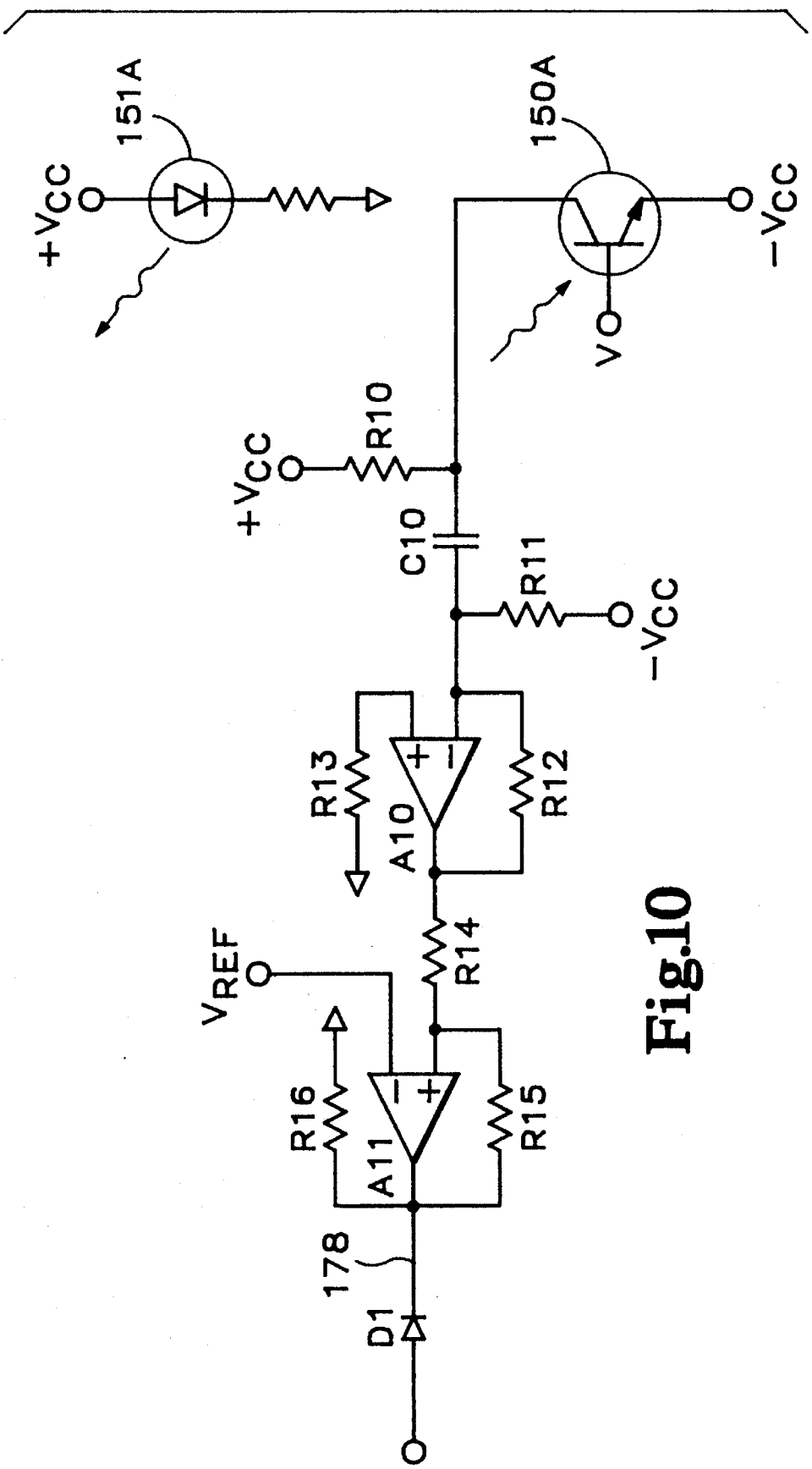
FIG. 10 is a schematic of a comparator circuit used in connection with the photodetectors of the second embodiment shown in FIG. 8.

Referring now to FIG. 10, a comparator circuit is shown which is used in conjunction with each of the photodetectors shown in FIG. 8. The comparator circuit shown in FIG. 10 is shown in connection with the photodetector 150A which, in the preferred embodiment, is a phototransistor as shown. The phototransistor 150A conducts responsive to receiving light from the LEDs reflected off the underside of the club head.

The voltage produced by the phototransistor 150A is DC coupled to an op-amp A10 via capacitor C10. Op-amp A10 amplifies the output voltage produced by the phototransistor 150A and couples the amplified voltage to a second op-amp A11 configured as a comparator. The op-amp A11 has as one of its inputs the reference voltage $V_{REF}$. The op-amp A11 compares the amplified voltage produced by the op-amp A10 to the reference voltage $V_{REF}$. The voltage at the output of op-amp A11 can thereafter be read on line 178 by the microcontroller 158 to determine the results of the comparison. This circuit is replicated for each of the photodetectors shown in FIG. 8.

Figure 11A:
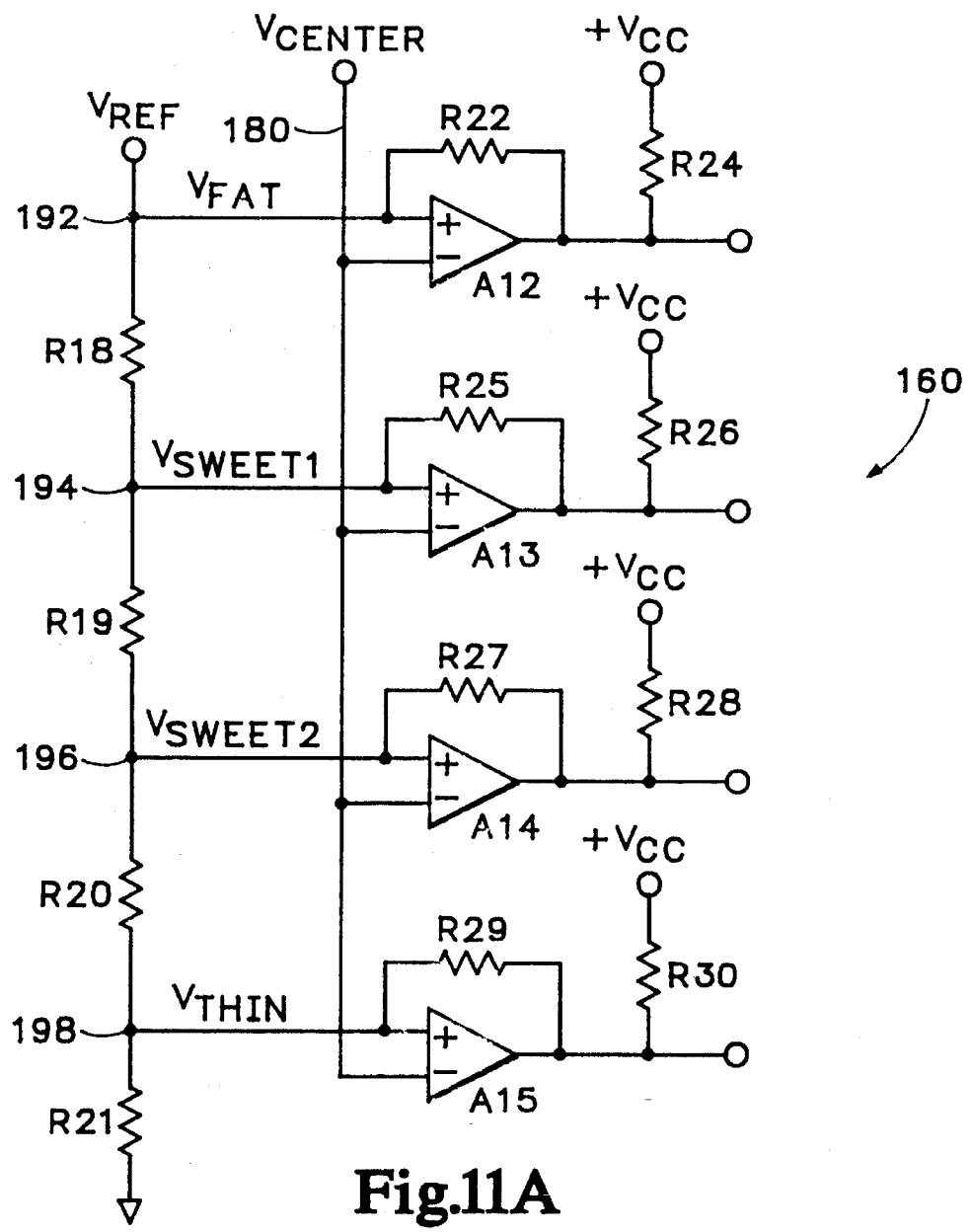
FIG. 11A is a schematic of the club head height detector circuit shown in FIG. 9.

Referring now to FIG. 11A, the club head height detector 160 is shown in more detail. The height detector 160 includes a resistor divider network consisting of resistors R18–R21. Coupled to the resistor network is the reference voltage $V_{REF}$. The resistor divider network divides down the reference voltage $V_{REF}$ to produce fractional reference voltage signals. Also included in the height detector circuit 160 is a plurality of op-amps A12–A15 configured as comparators. Signal line 180 is connected to the inverting input of each of the op-amps for providing a voltage signal $V_{CENTER}$, which is the output voltage signal produced by the center photodetector 150G (FIG. 8).

The noninverting inputs of the op-amps A12–A15 are connected to a corresponding node in the resistor network 192–198, respectively, for receiving a respective fractional portion of the reference voltage. Op-amp A12 receives a voltage signal $V_{FAT}$ which corresponds to the voltage level of a "fat" swing. In this case, $V_{FAT}$ is equal to the reference voltage $V_{REF}$. Op-amp A13 receives a voltage signal $V_{SWEET1}$ which corresponds to a "sweet" shot. Op-amp A14 receives a voltage signal $V_{SWEET2}$ which also corresponds to a "sweet" shot. The voltage signals $V_{SWEET1}$ and $V_{SWEET2}$ provide a voltage range in which a shot will be considered "sweet." Alternatively, only a single op-amp could be used to represent a "sweet+ shot. Finally, op-amp A15 receives a voltage signal $V_{THIN}$ which corresponds to a "thin" shot. It should be apparent that, the higher the respective fractional portion of the reference voltage, the higher the voltage produced by the center photodetector 150G must be for the corresponding op-amp to produce a positive output signal. The higher the voltage produced by the center photodetector 150G, however, the closer the club head must be to the mat.

Figure 11B:
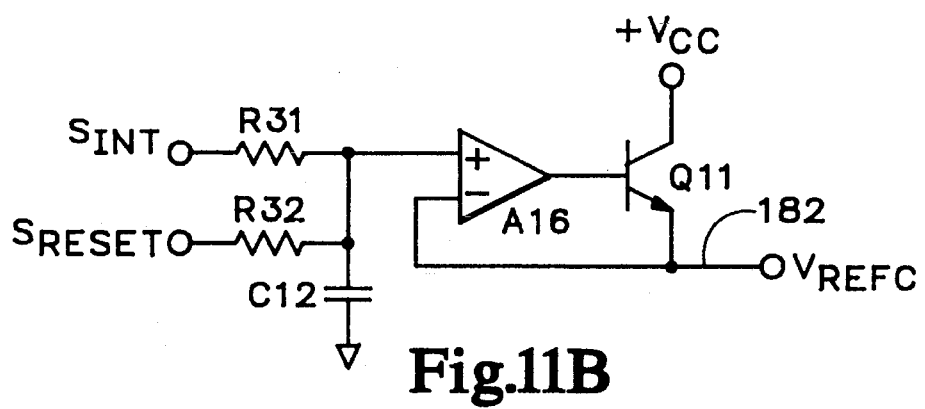
FIG. 11B is a schematic of a reference voltage circuit for the center photodetector of FIG. 8.

Referring now to FIG. 11B, a reference voltage circuit for the center photodetector 150G is shown. The reference circuit produces a unique reference voltage $V_{REFC}$ for the center photodetector 150G to allow the microcontroller 158 to calibrate the height detector circuit 160 based on the user's preferred club height at address, as described further below. The circuit includes a transistor Q11 which produces the reference voltage $V_{REFC}$ at its emitter. An op-amp A16 is interposed between the base of the transistor and the emitter. The output of the op-amp A16 is connected to the base of the transistor Q11 for setting the bias point of transistor Q11. The emitter of transistor Q11 is connected to the inverting input of op-amp A16. A capacitor C12 is connected to the noninverting input of the op-amp A16. A first resistor R31 is connected to the capacitor C12 for charging the capacitor responsive to a charging signal $S_{INT}$ on line 172. A second resistor R32 is connected to the capacitor C12 for discharging the capacitor C12 responsive to a discharge signal $S_{RESET}$ produced by a microcontroller 158 on line 174 (FIG. 9). The operation of the reference voltage circuit of FIG. 11B is described below.

In operation, the second embodiment of the invention allocates the task of computing the swing characteristics to the microcontroller rather than to the personal computer as in the first embodiment. The microcontroller 158 (FIG. 9) processes all of the digital data produced by the comparator circuits for each of the photodetectors. The microcontroller processes all of the digital data from the comparators to produce a packet of swing characteristic information required by the video golf simulator. This packet includes information about the club head position at impact, the club head direction following impact, club head height at impact, and club head speed at impact. The club head position is determined in essentially the same manner as described with reference to FIG. 5A–5C, except that the method shown therein is performed by the microcontroller 158 rather than the personal computer 12. Also, the method shown in FIG. 5A–5C is extended to include all 13 photodetectors of the first array of photodetectors 150 in the second embodiment of the invention.

The club head direction, i.e., follow-through, is determined by the microcontroller 158 (FIG. 9) by sampling the comparator outputs for the second array of photodetectors 156 (FIG. 8). For a straight follow-through, the club head will pass over the center photodetectors, e.g., 156B–156E, and be detected thereby. For a right follow-through, the club head will be detected by the rightmost photodetectors, e.g., 156A–156D, and will be detected thereby. For a left follow through, the club head will be detected by the leftmost photodetectors, e.g., 156E–156H. Thus, by sampling the outputs of the second array 156 comparator outputs, the microcontroller 158 can determine the club head follow-through direction.

Microcontroller 158 computes the club head speed as follows. The microcontroller 158 periodically samples the comparator output corresponding to the photodetector array 154. All of the outputs of the photodetectors of array 154 are ORed together to produce a single output signal. The outputs of array 152 are similarly ORed. When the comparator indicates that the club head has passed over the array 154, the microcontroller 158 resets an internal timer. Then, the microcontroller 158 samples the ORed output corresponding to photodetector array 152. When the microcontroller 158 detects that the club head has passed over the array 152, the microcontroller reads the contents of the timer which indicates the amount of elapsed time between the club head passing over the array 154 and the photodetector 152A. The microcontroller 158 can then calculate the velocity by dividing the distance $d_3$ by the elapsed time.

The club head speed is also used by the microcontroller to determine an optimal club head sampling rate. In the prior art, the sampling rate of the photodetectors is determined by the maximum club head velocity, e.g., 100 mph. If, however, a substantially slower club head speed is detected, an excessive number of samples will be produced. Each of these samples must then be stored in a temporary memory, e.g., an external RAM for subsequent processing. Thus, in the prior art, the minimum club head speed establishes the minimum amount of memory required to hold the samples.

According to the invention, however, the microcontroller optimizes the club head sampling rate responsive to the detected club head velocity. A microcontroller 158 optimizes the club head sampling rate by first choosing a target number of samples. In the preferred embodiment, the target number of samples is equal to the available number of RAM memory locations internal to the microcontroller 158. Microcontroller 158, in the preferred embodiment, includes 64 such available memory locations. Next, the microcontroller chooses a target club head velocity. Usually this target club head velocity corresponds to the maximum club head velocity. Based on the chosen target head velocity and the available number of samples, the microcontroller 158 selects a target club head sampling rate. This selected target club head sampling rate will then be used whenever the detected club head velocity is equal to the target club head velocity.

If, however, the detected club head velocity differs from the target club head velocity, the microcontroller 158 will vary the sampling rate in response to deviations of the detected club head velocity from the target club head velocity. The club head sampling rate is varied so as to produce only the target number of samples regardless of the club head velocity. The club head sampling rate can be varied by changing the parameters of a timing loop or by changing the value in the on-chip timer, which can be used to trigger the sampling. This permits the microcontroller to use a fixed amount of memory, i.e., 64 locations, regardless of the speed of the club head. As a result, in the preferred embodiment, an external RAM has been completely eliminated.

A method of detecting the club head height begins by calibrating the center photodetector 150G. A center photodetector is calibrated to establish a desired club head height at impact. This allows the user to specify the preferred club head height. This roughly approximates different tee heights used by different users. The detected height is then classified by comparing the detected height to the height specified by the user during the calibration process.

Figure 12:
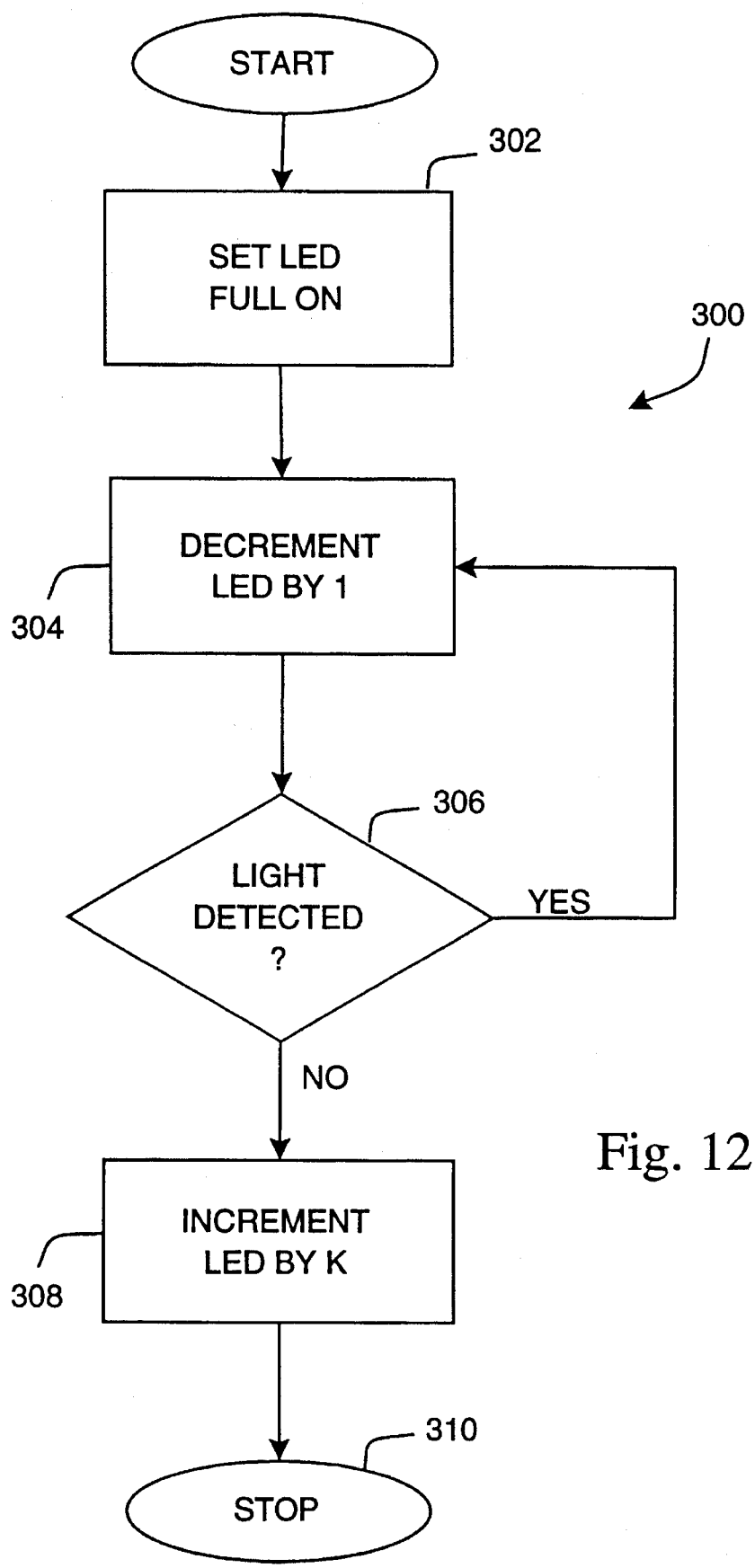
FIG. 12 is a flow chart showing a method of calibrating the height detector circuit of FIG. 8.

The calibration process is shown in FIG. 12. The first step in the calibration process is for the user to address the ball with his club head. The height at which the user sets the club head during this address establishes preferred club head height at impact. The microcontroller 158 will then set the LED 151G corresponding to the center photodetector to the full on position. The microcontroller 158 sets the LED 151G full on by sending successive voltage signals $S_{INT}$ on line 172. The successive signals charge up capacitor C12 of FIG. 11B to the maximum voltage level. The maximum voltage level on capacitor C12 produces a maximum voltage level on reference voltage $V_{REFC}$ which is coupled to LED 150P.

Next, in step 304, microcontroller 158 ratchets the reference voltage $V_{REFC}$ down by given increments by issuing a short negative going voltage signal $S_{RESET}$ on line 174. This causes the voltage on capacitor C12 to be reduced by a corresponding incremental voltage, which in turn reduces the voltage reference $V_{REFC}$. This reduced reference voltage $V_{REFC}$ in turn lowers in the intensity of the LED 151G. In step 306 the microcontroller 158 samples the comparator output coupled to the center photodetector 150G to determine whether the center photodetector 150G detected the light emitted by LED 150. If some reflected light was detected in step 306, step 304 is repeated. This sequence of steps 304 and 306 is repeated until no light is detected by the center photodetector 150G, i.e., enough light to cause the corresponding comparator to produce a digital output signal.

Once the light can no longer be detected by the center photodetector, a microcontroller 158 increases the light intensity produced by the LED 150P by a predetermined amount of intensity. This predetermined amount establishes a threshold intensity corresponding to a "thin" shot. This method requires a substantially uniform reflective surface on the bottom of the club head. As a result, non-uniform club heads must be covered with a reflective tape to present such a uniform reflective surface to the photodetectors.

Figure 13:
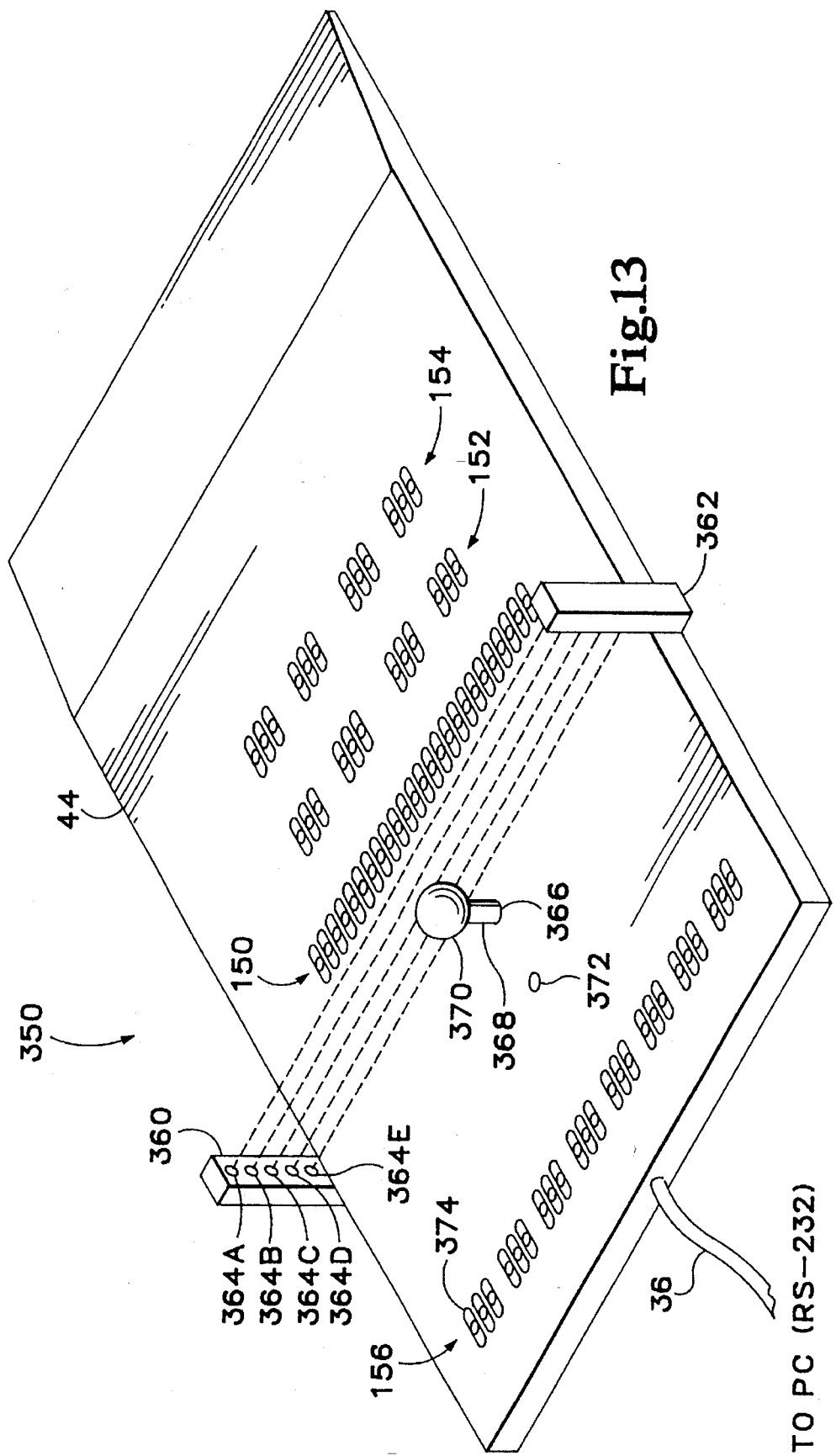
FIG. 13 is a third embodiment of the invention.

Referring now to FIG. 13, a third embodiment of a swing sensor 350 is shown. The swing sensor 350 is substantially identical to the second embodiment shown in FIG. 8 and, accordingly, common elements between the two embodiments have common reference designators. Added in this embodiment, however, are two vertical columns 360 and 362 for detecting the club head height and club face pitch at impact. The column 360 includes a vertically-spaced, horizontally-directed array of LEDs 364A–364E. Column 362 includes a vertically-spaced array of photodetectors (not visible) facing the LEDs along parallel lines of sight across the swing path 42. The LEDs 364A–364E form a vertical plane of parallel light lines through which the club head passes when swung.

Also included in sensor 350 is a ready light 372, which indicates to the user that the sensor is ready to detect a swing. The pad 44 also has formed thereon a plurality of slots such as slot 374 in which the LEDs and photodetectors are received. The slots allow the photodetectors and LEDs to be recessed below the upper surface of the pad 44 to shelter them from the club head in the event the club head strikes the pad. In a preferred embodiment, transparent plastic covers or inserts are received in the slots to form a substantially uniform upper surface of the pad 44.

The ready light 372, as indicated above, is used to inform the user that the sensor 350 is ready to detect the user's swing. The ready light is necessary because many users "waggle" the club prior to taking their swing. In order for the waggle to not be sensed as a valid swing, the sensor 350 includes a waggle detector, which drives ready light 372.

The waggle detector is implemented in software in the microcontroller 150 and operates as follows. If photodetector array 150 detects the club head, the microcontroller continues to sample the array 150 until it no longer detects the presence of the club. Next, the sensor circuitry detects the club passing through arrays 154 and 152, in that order. At this point, the microcontroller does not determine whether the movement of the club is a waggle or an actual swing. The microcontroller cannot merely use the velocity of the club head to make this determination because some swings, such as a putt, have a very low velocity. Next, the microcontroller looks for the presence of the club at array 150 again. Once the sensor circuitry detects the club head, the sensor software waits a predetermined amount of time before checking the array 156 for the follow-through. If the sensor circuitry does not detect the club head at array 156, but instead detects the club head at any of arrays 150, 152, or 154, the sensor software classifies the club head movement as a waggle and, therefore, does not transmit the club head information to the personal computer 12. If, on the other hand, the sensor circuitry detects the club head at array 156 after this predetermined amount of time, the swing is classified as a valid swing and the microcontroller transmits the club head information to the personal computer 12.

The embodiment shown in FIG. 13 also uses a different method to determine the club head height. The sensor 350 determines the height of the club head from the mat 44 by sampling the outputs of the photodetectors mounted on vertical column 362. The sensor circuitry can readily determine the height by sensing the output of the lowest photodetector that detects the club head.

Figure 14:
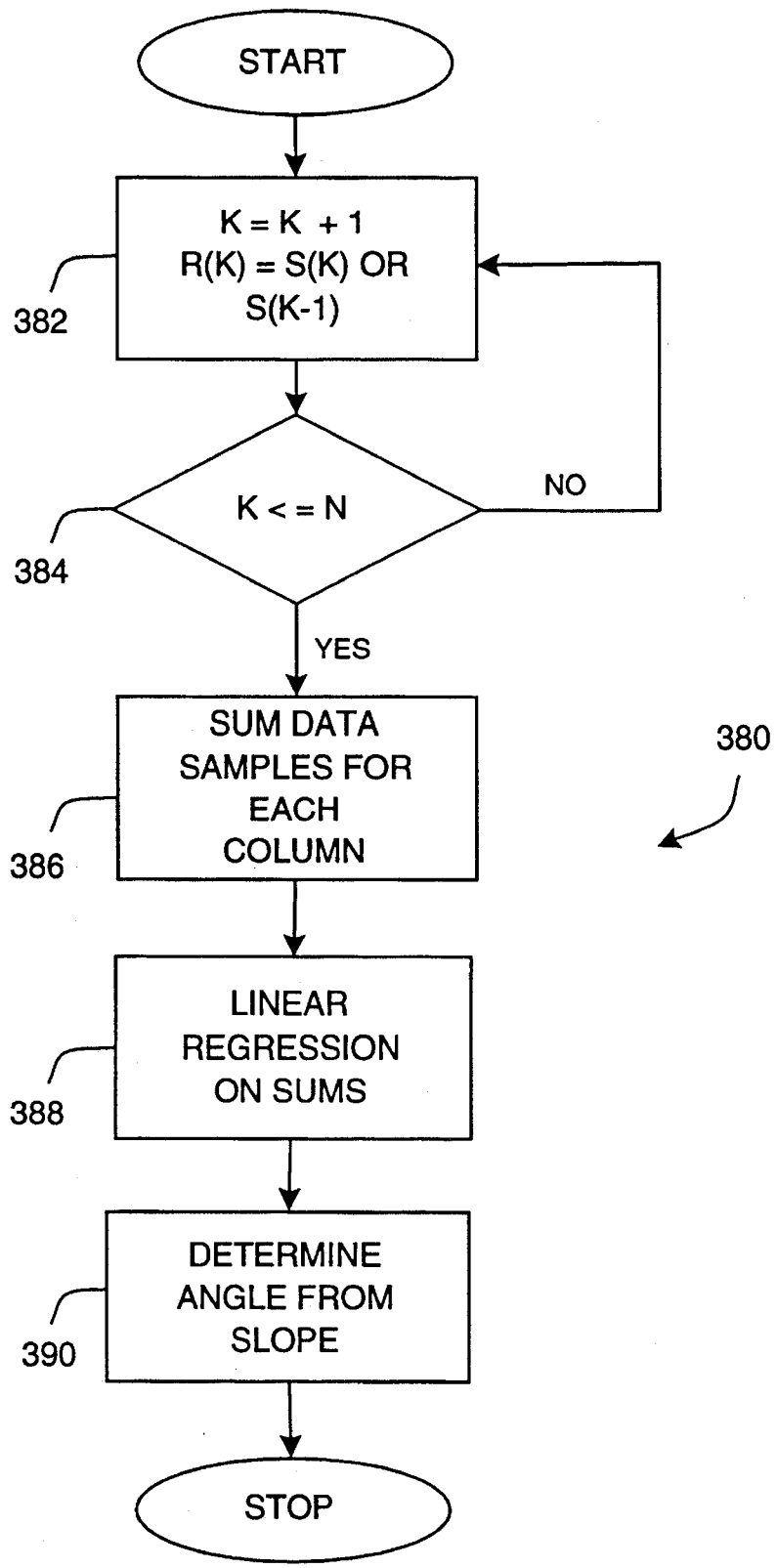
FIG. 14 is a flow chart showing a method of calculating a club head angle at impact.

The sensor 350 also uses a method 380 of determining the club face angle different from that described above and shown in FIGS. 5A–5C. The method 380 of determining the club face angle at impact according to the third embodiment is shown in FIG. 14. The method operates on a matrix of output data from the photodetector array 150. In the preferred embodiment, the matrix includes twenty-six thirteen-bit samples of the output of array 150 taken at successive intervals, where the interval is determined by the velocity of the club head, as described above. This is the same data that the previously-described method operated on. An exemplary matrix of output data is shown in Table 1. A binary one (1) indicates that a photodetector detected the club head while a binary zero (0) indicates that the club head was not detected by the photodetector.

TABLE 1

Matrix (26 × 13) of photodetector samples.

| | | | | | | | | | | | | | |
|---|---|---|---|---|---|---|---|---|---|---|---|---|---|
| 1 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 |
| 6 | 0 | 0 | 0 | 0 | 0 | 0 | 0 | 0 | 0 | 0 | 0 | 1 | 1 |
| 7 | 0 | 0 | 0 | 0 | 0 | 0 | 0 | 0 | 0 | 0 | 1 | 1 | 1 |
| 8 | 0 | 0 | 0 | 0 | 0 | 0 | 0 | 0 | 0 | 1 | 1 | 1 | 1 |
| 9 | 0 | 0 | 0 | 0 | 0 | 0 | 0 | 0 | 1 | 1 | 1 | 1 | 1 |
| 10 | 0 | 0 | 0 | 0 | 0 | 0 | 0 | 1 | 1 | 1 | 1 | 1 | 1 |
| 11 | 0 | 0 | 0 | 0 | 0 | 0 | 1 | 1 | 1 | 1 | 1 | 1 | 0 |
| 12 | 0 | 0 | 0 | 0 | 0 | 1 | 1 | 1 | 1 | 1 | 1 | 0 | 0 |
| 13 | 0 | 0 | 0 | 0 | 1 | 1 | 1 | 1 | 1 | 1 | 0 | 0 | 0 |
| 14 | 0 | 0 | 0 | 1 | 1 | 1 | 1 | 1 | 1 | 0 | 0 | 0 | 0 |
| 15 | 0 | 0 | 1 | 1 | 1 | 1 | 1 | 1 | 0 | 0 | 0 | 0 | 0 |
| 16 | 0 | 1 | 1 | 1 | 1 | 1 | 1 | 0 | 0 | 0 | 0 | 0 | 0 |
| 17 | 1 | 1 | 1 | 1 | 1 | 1 | 0 | 0 | 0 | 0 | 0 | 0 | 0 |
| 18 | 1 | 1 | 1 | 1 | 1 | 0 | 0 | 0 | 0 | 0 | 0 | 0 | 0 |
| 19 | 1 | 1 | 1 | 1 | 0 | 0 | 0 | 0 | 0 | 0 | 0 | 0 | 0 |
| 20 | 1 | 1 | 1 | 0 | 0 | 0 | 0 | 0 | 0 | 0 | 0 | 0 | 0 |
| 21 | 1 | 1 | 0 | 0 | 0 | 0 | 0 | 0 | 0 | 0 | 0 | 0 | 0 |
| 22 | 1 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 |
| 26 | 0 | 0 | 0 | 0 | 0 | 0 | 0 | 0 | 0 | 0 | 0 | 0 | 0 |

The method 380 of determining the club face angle at impact begins in steps 382 and 384 by logically ORing together successive samples. Steps 382 and 384 form a loop whereby, for each sample, the sample is logically ORed with the preceding sample and the result is stored back in the matrix. As a result of this operation, once a photodetector detects the club head, i.e., a binary one, all successive samples of this photodetector will indicate the presence of the club. The resultant matrix produced by steps 382 and 384 for the matrix of Table 1 is shown below in Table 2.

TABLE 2

Resultant Matrix (26 × 13) of O Red photodetector samples.

| | | | | | | | | | | | | | |
|---|---|---|---|---|---|---|---|---|---|---|---|---|---|
| 1 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 |
| 6 | 0 | 0 | 0 | 0 | 0 | 0 | 0 | 0 | 0 | 0 | 0 | 1 | 1 |
| 7 | 0 | 0 | 0 | 0 | 0 | 0 | 0 | 0 | 0 | 0 | 1 | 1 | 1 |
| 8 | 0 | 0 | 0 | 0 | 0 | 0 | 0 | 0 | 0 | 1 | 1 | 1 | 1 |
| 9 | 0 | 0 | 0 | 0 | 0 | 0 | 0 | 0 | 1 | 1 | 1 | 1 | 1 |
| 10 | 0 | 0 | 0 | 0 | 0 | 0 | 0 | 1 | 1 | 1 | 1 | 1 | 1 |
| 11 | 0 | 0 | 0 | 0 | 0 | 0 | 1 | 1 | 1 | 1 | 1 | 1 | 1 |
| 12 | 0 | 0 | 0 | 0 | 0 | 1 | 1 | 1 | 1 | 1 | 1 | 1 | 1 |
| 13 | 0 | 0 | 0 | 0 | 1 | 1 | 1 | 1 | 1 | 1 | 1 | 1 | 1 |
| 14 | 0 | 0 | 0 | 1 | 1 | 1 | 1 | 1 | 1 | 1 | 1 | 1 | 1 |
| 15 | 0 | 0 | 1 | 1 | 1 | 1 | 1 | 1 | 1 | 1 | 1 | 1 | 1 |
| 16 | 0 | 1 | 1 | 1 | 1 | 1 | 1 | 1 | 1 | 1 | 1 | 1 | 1 |
| 17 | 1 | 1 | 1 | 1 | 1 | 1 | 1 | 1 | 1 | 1 | 1 | 1 | 1 |
| 18 | 1 | 1 | 1 | 1 | 1 | 1 | 1 | 1 | 1 | 1 | 1 | 1 | 1 |
| 19 | 1 | 1 | 1 | 1 | 1 | 1 | 1 | 1 | 1 | 1 | 1 | 1 | 1 |
| 20 | 1 | 1 | 1 | 1 | 1 | 1 | 1 | 1 | 1 | 1 | 1 | 1 | 1 |
| 21 | 1 | 1 | 1 | 1 | 1 | 1 | 1 | 1 | 1 | 1 | 1 | 1 | 1 |
| 22 | 1 | 1 | 1 | 1 | 1 | 1 | 1 | 1 | 1 | 1 | 1 | 1 | 1 |
| 23 | 1 | 1 | 1 | 1 | 1 | 1 | 1 | 1 | 1 | 1 | 1 | 1 | 1 |
| 24 | 1 | 1 | 1 | 1 | 1 | 1 | 1 | 1 | 1 | 1 | 1 | 1 | 1 |
| 25 | 1 | 1 | 1 | 1 | 1 | 1 | 1 | 1 | 1 | 1 | 1 | 1 | 1 |
| 26 | 1 | 1 | 1 | 1 | 1 | 1 | 1 | 1 | 1 | 1 | 1 | 1 | 1 |

After the resultant matrix is computed, each of the vertical columns in the resultant matrix is summed in step 386. The result of this step is a one-dimensional array of sums. For example, for the resultant matrix shown in Table 2, the array of sums includes the following elements: 10, 11, 12, 13, 14, 15, 16, 17, 18, 19, 20, 21, 22.

In step 388, the method 380 performs a linear least squares fit regression on the array of sums. The regression step 388 produces a linear expression of the form Y=m X+b, where m is equal to the slope of the line. This slope is used in step 390 to determine the club face angle. The club face angle can be determined from the slope by taking the arctangent of the slope. In the preferred embodiment, the arctangent function can be approximated by multiplying the slope by 2. The club face angle can then be used by the video game to determine whether the swing was a hook, slice, or straight swing.

The method 380 can also be applied to the data produced by the vertical array of photodetectors mounted in vertical column 362. The only difference being the size of the initial matrix. By using the above-described method 380 on the samples produced by the vertical array of photodetectors, the pitch or vertical offset angle of the club face can be determined as well. This angle can then be used by the video game to determine the trajectory of the golf ball.

The allocation of the various computational steps described above can vary depending on the relative performance of the microcontroller 158 as compared to the personal computer 12. If the microcontroller has substantially less computing power than the personal computer, much of the computational tasks can be allocated to the personal computer and the swing sensor can simply transmit the raw sample data to the personal computer. In this case, a driver can be written to run on the personal computer to read in the raw sample data from the swing sensor and compute the various swing characteristics using the methods described above. Such swing characteristics include club head speed, club face angle, the horizontal club offset from center, swing follow-through, club face pitch, and club head height. In other embodiments where the microcontroller has greater computational capability, these swing characteristics can be computed by microcontroller 158 and just these variables can be transmitted to the personal computer 12.

Having described and illustrated the principles of the invention in a preferred embodiment thereof, it should be apparent that the invention can be modified in arrangement and detail without departing from such principles. For example, the number of photodetectors in the second embodiment can be changed without departing from the scope of the invention. I claim all modifications and variation coming within the spirit and scope of the following claims.

I claim:

1. A golf club swing sensing system for sensing a golf club head moving along a club path and supplying the sensed information to a personal computer having a microprocessor, an input port, a monitor and a golf video game operable on the microprocessor, the sensing system comprising:

a horizontal pad having a club head axis defined thereon;

a light source including a first plurality of light emitting diodes for illuminating the underside of the club head disposed in the pad;

means disposed in the pad transversely of the club head axis for sensing the offset of the club head relative to the club head axis responsive to light from the light source reflected off an underside of the club head;

means coupled to the sensing means for converting the offset to a digital format, said sensing means including a first linear array of photodetectors disposed transversely to the club head axis, one of the first plurality of light emitting diodes being interposed between adjacent photodetectors of the first linear array, each photodetector producing an output signal proportional to the amount of detected light reflected off the underside of the club head;

means coupled between the converting means and the personal computer for transmitting the digital format offset to the microprocessor for input to the golf video game; and means for detecting club head direction including
   a second plurality of light emitting diodes for illuminating the underside of the club head, and
   a second sensing means including a second linear array of photodetectors disposed in parallel with the first linear array of photodetectors, one of the second plurality of light emitting diodes being adjacent each photodetector of the first linear array, each photodetector producing an output signal proportional to the amount of detected light reflected off the underside of the club head.

2. A golf club swing sensing system according to claim 1 further comprising means for detecting the height of the club head at the club head axis responsive to the light from the light source reflected off the underside of the club head.

3. A golf club swing sensing system according to claim 2 wherein the means for detecting the height of the club head at the club head axis comprises:

a resistor divider network having an input for receiving a reference voltage signal and a plurality of outputs for providing a respective fractional reference voltage signal; and a plurality of comparators each having a first input coupled to the sensing means for receiving a voltage signal proportional to the light detected by the sensing means, a second input connected to a respective one of the resistor divider network outputs for receiving a respective reference voltage signal, and an output for producing a respective output height signal.

4. A golf club swing sensing system for sensing a golf club head moving along a club path and supplying the sensed information to a personal computer having a microprocessor, an input port, a monitor and a golf video game operable on the microprocessor, the sensing system comprising:

a horizontal pad having a club head axis defined thereon;

a light source including a first plurality of light emitting diodes for illuminating the underside of the club head disposed in the pad wherein first plurality of light emitting diodes include a plurality of pairs of light emitting diodes, each pair being associated with a corresponding photodetector, each one of the pair being disposed on a respective side of the corresponding photodetector;

means disposed in the pad transversely of the club head axis for sensing the offset of the club head relative to the club head axis responsive to light from the light source reflected off an underside of the club head;

means coupled to the sensing means for converting the offset to a digital format, said sensing means including a first linear array of photodetectors disposed transversely to the club head axis, one of the first plurality of light emitting diodes being interposed between adjacent photodetectors of the first linear array, each photodetector producing an output signal proportional to the amount of detected light reflected off the underside of the club head;

means coupled between the converting means and the personal computer for transmitting the digital format offset to the microprocessor for input to the golf video game;

means for driving one of the light emitting diodes of each pair with a clock signal; and means for driving the other one of the light emitting diodes of each pair with a complementary clock signal, wherein the intensity of the combined light emitted by each pair exceeds the maximum intensity of the individual light emitting diodes.

5. A golf club swing sensing system according to claim 4 wherein the converting means comprises a comparator having a first input coupled to a respective one of the photodetectors for receiving a voltage signal proportional to the light detected by the respective photodetector, a second input for receiving a reference voltage, and an output coupled to the transmitting means.

6. A golf club swing sensing system according to claim 5 wherein the transmitting means comprises:

a microcontroller having a plurality of inputs coupled to the converting means, and an output; and a cable connected to the microcontroller output and connectable to the input port of the computer.

7. A golf club swing sensing system according to claim 5 wherein the clock signal and the complementary clock signal each have a frequency approximately equal to the maximum bandwidth of the individual light emitting diodes.

8. A golf club swing sensing system for sensing a golf club head moving along a club path and supplying the sensed information to a personal computer having a microprocessor, an input port, a monitor and a golf video game operable on the microprocessor, the sensing system comprising:

a horizontal pad having a club head axis defined thereon;

a light source disposed in the pad;

means disposed in the pad transversely of the club head axis for sensing the offset of the club head relative to the club head axis responsive to light from the light source reflected off an underside of the club head;

means coupled to the sensing means for converting the offset to a digital format; and means coupled between the converting means and the personal computer for transmitting the digital format offset to the microprocessor for input to the golf video game, wherein said transmitting means includes:
- a cable having first and second sets of conductors coupled to the converting means,
- a first game board connector coupled to the first set of conductors, and
- a second game board connector coupled to the second set of conductors, the first and second connectors being connectable to first and second compatible connectors, respectively, on a dual port game card received in the personal computer.

9. A golf club swing sensing system for sensing a golf club head moving along a club path and supplying the sensed information to a personal computer having a microprocessor, an input port, a monitor and a golf video game operable on the microprocessor, the sensing system comprising:

a horizontal pad having a club head axis defined thereon;

a light source disposed in the pad;

means disposed in the pad transversely of the club head axis for sensing the offset of the club head relative to the club head axis responsive to light from the light source reflected off an underside of the club head;

means coupled to the sensing means for converting the offset to a digital format;

means coupled between the converting means and the personal computer for transmitting the digital format offset to the microprocessor for input to the golf video game;

means for detecting the height of the club head at the club head axis responsive to the light from the light source reflected off the underside of the club head, said height detector means including:
- a resistor divider network having an input for receiving a reference voltage signal and a plurality of outputs for providing a respective fractional reference voltage signal, and
- a plurality of comparators each having a first input coupled to the sensing means for receiving a voltage signal proportional to the light detected by the sensing means, a second input connected to a respective one of the resistor divider network outputs for receiving a respective reference voltage signal, and an output for producing a respective output height signal; and means for calibrating the height detector means including:
- a capacitor,
- a first resistor coupled to the capacitor for charging the capacitor to a desired voltage level,
- a second resistor coupled to the capacitor for discharging the capacitor,
- an amplifier having an input coupled to the capacitor for receiving the capacitor voltage level, and an output, and
- means coupled between the amplifier output and the light source for producing a bias voltage, the light source being responsive to the bias voltage to adjust the light produced thereby in accordance with changes in the bias voltage.

10. A golf club swing sensing system for sensing a golf club head moving along a club path and supplying the sensed information to a personal computer having a microprocessor, an input port, a monitor and a golf video game operable on the microprocessor, the sensing system comprising:

means for detecting the velocity of the club head;

means for determining an optimal club head sampling rate responsive to the detected club head velocity;

means for detecting the club head position at the optimal club head sampling rate;

means for determining swing characteristics from the detected club head position; and means for transmitting the swing characteristics to the personal computer, wherein the video game is responsive to the swing characteristics to determine a ball path on the monitor corresponding to the swing characteristics.

11. A golf club swing sensing system according to claim 10 wherein the means for determining an optimal club head sampling rate responsive to the velocity of the club face includes a microcontroller having a predetermined number of memory locations.

12. A golf club swing sensing system according to claim 11 wherein the means for determining an optimal club head sampling rate responsive to the velocity of the club face includes means for varying optimal club head sampling rate from a target club head sampling rate in response to deviations of the detected club head velocity from the target club head velocity.

13. A golf club swing sensing system according to claim 10 wherein the means for detecting the velocity of the club head includes:

a first photodetector positioned along the club path for detecting the light from the light source reflected off the underside of the club head, the first photodetector having an output for producing a first output signal proportional to the amount of light detected by the first photodetector;

a second photodetector disposed a predetermined distance from the first photodetector along the club path for detecting the light from the light source reflected off the underside of the club head, the second photodetector having an output producing a second output signal proportional to the amount of light detected by the second photodetector;

first comparator coupled to the first photodetector for converting the first output signal to a first digital signal;

second comparator coupled to the second photodetector for converting the second output signal to a second digital signal;

means for timing transitions between the first digital signal and the second digital signal; and means for converting the time between transitions to a velocity.

14. A method of controlling a golf video game operating on a personal computer having a monitor which operates responsive to a golf club, the golf club head attached at an end of a shaft and having a club face for impacting a golf ball, the method comprising:

detecting the height of the club head at an impact point during address;

detecting the height of the club head at the impact point as the club head moves along a club head path;

comparing the detected club head height detected as the club head moves along a club head path with the detected club head height detected during address;

classifying the swing responsive to the comparison; and transmitting the swing classification to the personal computer wherein the golf video game is responsive thereto;

wherein the step of detecting the height of the club head at an impact point during address includes generating a light beam that is directed at an underside of the club head, detecting the amount of generated light reflected off the underside of the club head, reducing the intensity of the light beam until no amount of generated light reflected off the underside of the club head can be detected, and increasing the intensity of the light beam a predetermined amount to establish a threshold light intensity.

15. A method of controlling a golf video game according to claim 14 wherein the step of detecting the height of the club head at the impact point as the club head moves along a club head path includes detecting the amount of generated light reflected off the underside of the club head.

16. A method of controlling a golf video game according to claim 15 wherein the step of comparing the detected club head height detected as the club head moves along a club head path with the detected club head height detected during address includes comparing the amount of generated light reflected off the underside of the club head detected as the club head moves along the club head path with the threshold light intensity.

17. A method of controlling a golf video game according to claim 14 further comprising detecting a plurality of offset angles of the club face relative to a vector as the club head moves past the impact point as the club head moves along a club head path.

18. A method of controlling a golf video game according to claim 17 further comprising:

classifying each detected offset angle as a hook, a slice, or a straight offset angle;

accumulating the hook offset angles;

accumulating the slice offset angles; and characterizing the swing as a hook swing where the accumulated hook offset angles exceeds a predetermined hook amount, and characterizing the swing as a slice swing where the accumulated slice offset angles exceeds a predetermined slice amount.

19. A method of controlling a golf video game according to claim 18 wherein the step of detecting the offset angle includes detecting the club face at discrete sample points, and wherein the step of classifying each detected offset angle as a hook, a slice, or a straight offset angle includes:

comparing a first and a second adjacent samples; and determining a hook offset where the first sample is greater than the second sample, a slice offset where the first sample is less than the second sample, and a straight offset where the first sample is equal to the second sample.

20. A method of controlling a golf video game according to claim 19 further including repeating the comparing and determining steps for a plurality of adjacent pairs in the discrete points.

21. A method of controlling a golf video game according to claim 14 further comprising the step of detecting the velocity, the velocity detecting step comprising:

detecting the golf club head passing a starting point;

detecting the golf club head passing a stopping point, the stopping point being a predetermined distance along the club path from the starting point;

measuring the elapsed time between the club head passing the starting and stopping points; and dividing the predetermined distance by the elapsed time to calculate the club head velocity, the video game being responsive to the club head speed.

22. A method of controlling a golf video game operating on a personal computer having a monitor which operates responsive to a golf club having a club head attached at an end of a shaft, the method comprising:

detecting the velocity of the club head;

determining an optimal club head sampling rate responsive to the detected club head velocity;

detecting the club head position at the optimal club head sampling rate;

determining swing characteristics from the detected club head position; and communicating the swing characteristics to the personal computer, wherein the video game is responsive to the swing characteristics to determine a ball path on the monitor corresponding to the swing characteristics.

23. A method of controlling a golf video game according to claim 22 wherein the step of determining an optimal club head sampling rate responsive to the velocity of the club face includes:

choosing a target number of samples;

choosing a target club head velocity;

selecting a target club head sampling rate in accordance with the target club head velocity and the target number of samples; and varying optimal club head sampling rate from the target club head sampling rate in response to deviations of the detected club head velocity from the target club head velocity.

24. A method of controlling a golf video game according to claim 23 wherein the step of varying optimal club head sampling rate from the target club head sampling rate in response to deviations of the detected club head velocity from the target club head velocity includes decreasing the sampling rate in response to a decrease in the detected club velocity under the target club head velocity.

25. A method of controlling a golf video game according to claim 23 wherein the step of varying optimal club head sampling rate from the target club head sampling rate in response to deviations of the detected club head velocity from the target club head velocity includes increasing the sampling rate in response to an increase in the detected club velocity over the target club head velocity.

26. A method of controlling a golf video game according to claim 22 wherein the step or choosing a target number of samples includes allocating a predetermined number of memory locations for storing samples of the detected club head position.

27. A method of controlling a golf video game according to claim 26 wherein the step of choosing a target number of samples includes allocating 64 memory locations for storing samples of the detected club head position.

28. A method of controlling a golf video game according to claim 22 wherein the step of choosing a target club head velocity includes choosing a target head velocity equal to 100 miles per hour.

29. A method of controlling a golf video game operating on a personal computer having a monitor, the video game operable responsive to a golf club having a golf club head attached at an end of a shaft and having a club face for impacting a golf ball, the method comprising:

detecting a club head position including at least one angle of the club face; and transmitting the detected club head position information to the personal computer, wherein the video game is responsive to the detected club head information to determine a corresponding ball path;

wherein the step of detecting the club head position includes forming a matrix of club head samples, logically ORing successive samples of the matrix to form a resultant matrix, summing the columns of the resultant matrix, performing a regression analysis on the sums of the resultant matrix to produce a slope, and determining the angle of the club face from the slope.

30. A method of controlling a golf video game according to claim 29 wherein the step of determining the angle of the club face from the slope includes taking the arctangent of the slope to produce the club face angle.

31. A method of controlling a golf video game according to claim 29 wherein the step of determining the angle of the club face from the slope includes multiplying the slope by approximately two to produce the club face angle.

32. A method of controlling a golf video game operating on a personal computer having a monitor, the video game operable responsive to a golf club having a golf club head attached at an end of a shaft and having a club face for impacting a golf ball, the method comprising:

detecting a club head position including at least one angle of the club face;

transmitting the detected club head position information to the personal computer, wherein the video game is responsive to the detected club head information to determine a corresponding ball path;

detecting the follow-through of the club head by sensing reflected light off an underside of the club head;

detecting the height of the club head; and transmitting the club head height information and the club head follow-though information to the personal computer, wherein the video game is responsive to the detected club head information to determine a corresponding ball path.

33. A method of controlling a golf video game operating on a personal computer having a monitor, the video game operable responsive to a golf club having a golf club head attached at an end of a shaft and having a club face for impacting a golf ball, the method comprising:

detecting a club head position including at least one angle of the club face including sensing light reflected from an underside of the club head; and transmitting the detected club head position information to the personal computer, wherein the video game is responsive to the detected club head information to determine a corresponding ball path.

34. A method of controlling a golf video game according to claim 33 wherein the step of detecting the club head position includes determining a club head angle about a horizontal club swing path.

35. A method of controlling a golf video game according to claim 33 wherein the step of detecting the club head position includes determining a club face pitch relative to a vertical plane normal to a horizontal club swing path.

36. A method according to claim 33 in which detecting club head position includes sensing light transmitted horizontally across a club swing path.

\* \* \* \* \*